United States Patent
Lee

(10) Patent No.: US 11,259,043 B2
(45) Date of Patent: Feb. 22, 2022

(54) IMAGE SIGNAL ENCODING/DECODING METHOD, AND APPARATUS THEREFOR BASED ON DERIVING MERGE CANDIDATES

(71) Applicant: GUANGDONG OPPO MOBILE TELECOMMUNICATIONS CORP., LTD., Guangdong (CN)

(72) Inventor: Bae Keun Lee, Seongnam-si (KR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/244,720

(22) Filed: Apr. 29, 2021

(65) Prior Publication Data

US 2021/0250605 A1 Aug. 12, 2021

Related U.S. Application Data

(63) Continuation of application No. PCT/KR2019/015199, filed on Nov. 8, 2019.

(30) Foreign Application Priority Data

Nov. 8, 2018 (KR) .................. 10-2018-0136308
Nov. 27, 2018 (KR) .................. 10-2018-0148874

(51) Int. Cl.
*H04N 7/18* (2006.01)
*H04N 19/527* (2014.01)
(Continued)

(52) U.S. Cl.
CPC ......... *H04N 19/527* (2014.11); *H04N 19/105* (2014.11); *H04N 19/119* (2014.11); *H04N 19/176* (2014.11)

(58) Field of Classification Search
CPC .................................................... H04N 19/527
(Continued)

(56) References Cited

U.S. PATENT DOCUMENTS 9,560,374 B2   1/2017  Lim et al.
10,116,941 B2 * 10/2018  Jeon ...................... H04N 19/57
(Continued)

FOREIGN PATENT DOCUMENTS

KR     20140046091 A    4/2014
KR     20140136413 A   11/2014
(Continued)

OTHER PUBLICATIONS

International Search Report in the international application No. PCT/KR2019/015199, dated Feb. 14, 2020.

*Primary Examiner* — Leron Beck
(74) *Attorney, Agent, or Firm* — Perkins Coie LLP

(57) ABSTRACT

An image decoding method according to the present invention comprises the steps of: deriving a merge candidate of a current block from a neighboring block of the current block; adding the derived merge candidate to a merge candidate list; when the number of merge candidates previously added to the merge candidate list is less than a threshold value, adding at least one prediction area merge candidate included in a prediction area motion information table to the merge candidate list; deriving motion information about the current block on the basis of the merge candidate list; and performing motion compensation on the current block on the basis of the derived motion information.

28 Claims, 27 Drawing Sheets

(51) Int. Cl.
*H04N 19/105* (2014.01)
*H04N 19/119* (2014.01)
*H04N 19/176* (2014.01)

(58) Field of Classification Search
USPC ..................................... 375/240.01–240.29
See application file for complete search history.

(56) References Cited

U.S. PATENT DOCUMENTS

| | | | |
|---|---|---|---|
| 10,819,978 B2* | 10/2020 | Tamse | H04N 19/139 |
| 2013/0156335 A1 | 6/2013 | Lim | |
| 2013/0188720 A1* | 7/2013 | Wang | H04N 19/147 |
| | | | 375/240.16 |
| 2013/0336406 A1* | 12/2013 | Zhang | H04N 19/105 |
| | | | 375/240.16 |
| 2014/0146876 A1* | 5/2014 | Takehara | H04N 19/109 |
| | | | 375/240.02 |
| 2014/0153647 A1* | 6/2014 | Nakamura | H04N 19/513 |
| | | | 375/240.14 |
| 2014/0241435 A1 | 8/2014 | Park | |
| 2017/0332099 A1* | 11/2017 | Lee | H04N 19/122 |
| 2018/0310017 A1* | 10/2018 | Chen | H04N 19/593 |

FOREIGN PATENT DOCUMENTS

| | | |
|---|---|---|
| KR | 20170115969 A | 10/2017 |
| KR | 20180035193 A | 4/2018 |

\* cited by examiner

Rotation  Zoom-in

Zoom-out  Affine transform

| HmvpCandList | HmvpCand[0] | HmvpCand[1] | HmvpCand[2] | HmvpCand[3] | HmvpCand[4] | HmvpCand[5] |
| --- | --- | --- | --- | --- | --- | --- |
| | mvCand[0] | mvCand[1] | mvCand[2] | mvCand[2] | mvCand[2] | mvCand[2] |
| | RefIdxCand[0] | RefIdxCand[1] | RefIdxCand[2] | RefIdxCand[2] | RefIdxCand[2] | RefIdxCand[2] |
| | PARAL_ADDR[0]=0 | PARAL_ADDR[0]=1 | PARAL_ADDR[0]=4 | PARAL_ADDR[0]=4 | PARAL_ADDR[0]=4 | PARAL_ADDR[0]=2 |

Fig. 30

| HmvpCand[0] | HmvpCand[1] | HmvpCand[2] | HmvpCand[3] | HmvpCand[4] | HmvpCand[5] |
|---|---|---|---|---|---|
| mvCand[0] | mvCand[1] | mvCand[2] | mvCand[3] | mvCand[4] | mvCand[5] |
| RefIdxCand[0] | RefIdxCand[1] | RefIdxCand[2] | RefIdxCand[3] | RefIdxCand[4] | RefIdxCand[5] |
| CTU_ADDR[0]=0 | CTU_ADDR[1]=0 | CTU_ADDR[2]=1 | CTU_ADDR[3]=1 | CTU_ADDR[4]=2 | CTU_ADDR[5]=2 |
| MER_ADDR[0]=1 | MER_ADDR[1]=2 | MER_ADDR[2]=2 | MER_ADDR[3]=2 | MER_ADDR[4]=0 | MER_ADDR[5]=1 |

HmvpCandList

*Fig. 31*

IMAGE SIGNAL ENCODING/DECODING METHOD, AND APPARATUS THEREFOR BASED ON DERIVING MERGE CANDIDATES

CROSS REFERENCE TO RELATED APPLICATIONS

This is a continuation of International Application No. PCT/KR2019/015199, filed on Nov. 8, 2019, and entitled "IMAGE SIGNAL ENCODING/DECODING METHOD AND APPARATUS THEREOF", which is based on and claims priorities of Korean Application No. 10-2018-0136308, filed on Nov. 8, 2018 and Korean Application No. 10-2018-0148874, filed on Nov. 27, 2018. The disclosure of the above applications is hereby incorporated by reference in their entireties.

TECHNICAL FIELD

The present disclosure relates to a video signal encoding and decoding method and an apparatus therefor.

BACKGROUND

As display panels are getting bigger and bigger, video services of further higher quality are required more and more. The biggest problem of high-definition video services is significant increase in data volume, and to solve this problem, studies for improving the video compression rate are actively conducted. As a representative example, the Motion Picture Experts Group (MPEG) and the Video Coding Experts Group (VCEG) under the International Telecommunication Union-Telecommunication (ITU-T) have formed the Joint Collaborative Team on Video Coding (JCT-VC) in 2009. The JCT-VC has proposed High Efficiency Video Coding (HEVC), which is a video compression standard having a compression performance about twice as high as the compression performance of H.264/AVC, and it is approved as a standard on Jan. 25, 2013. With rapid advancement in the high-definition video services, performance of the HEVC gradually reveals its limitations.

SUMMARY

An object of the present disclosure is to provide a method of deriving a merge candidate using a prediction region motion information list and an apparatus for performing the method, in encoding/decoding a video signal.

Another object of the present disclosure is to provide a redundancy check method of checking redundancy between a prediction region merge candidate included in a prediction region motion information list and a merge candidate included in a merge candidate list, in encoding/decoding a video signal.

Another object of the present disclosure is to provide a method of deriving merge candidates of blocks included in a merge processing area and an apparatus for performing the method, in encoding/decoding a video signal.

The technical problems to be achieved in the present disclosure are not limited to the technical problems mentioned above, and unmentioned other problems may be clearly understood by those skilled in the art from the following description.

A method of decoding and encoding a video signal according to the present disclosure includes the steps of: deriving a merge candidate for a current block from a neighboring block of the current block; adding the derived merge candidate to a merge candidate list; adding at least one prediction region merge candidate included in a prediction region motion information list to the merge candidate list when the number of merge candidates added to the merge candidate list is smaller than a threshold value; deriving motion information for the current block based on the merge candidate list; and performing motion compensation for the current block based on the derived motion information. At this point, whether to add the prediction region merge candidate to the merge candidate list may be determined based on a result of comparison between motion information of the prediction region merge candidate and motion information of a merge candidate included in the merge candidate list.

In the method of decoding and encoding a video signal according to the present disclosure, the comparison may be performed on at least one merge candidate in the merge candidate list, of which an index is smaller than or equal to a threshold value.

In the method of decoding and encoding a video signal according to the present disclosure, the comparison may be performed on at least one among a merge candidate derived from a left neighboring block positioned on a left side of the current block and a merge candidate derived from a top neighboring block positioned on a top of the current block.

In the method of decoding and encoding a video signal according to the present disclosure, when it is determined that there is a merge candidate having motion information the same as that of a first prediction region merge candidate in the merge candidate list, the first prediction region merge candidate is not added to the merge candidate list, and whether to add to a second prediction region merge candidate to the merge candidate list may be determined based on a result of comparison between motion information of the second prediction region merge candidate included in the prediction region motion information list and motion information of the merge candidate included in the merge candidate list.

In the method of decoding and encoding a video signal according to the present disclosure, determination on whether the second prediction region merge candidate has motion information the same as that of a merge candidate having motion information the same as that of the first prediction region merge candidate may be omitted.

In the method of decoding and encoding a video signal according to the present disclosure, a difference between the number of prediction region merge candidates included in the prediction region merge candidate list and an index of the prediction region merge candidate may be smaller than or equal to a threshold value.

The method of decoding and encoding a video signal according to the present disclosure may further include the step of adding a current inter-region merge candidate derived based on motion information of the current block to the inter-region motion information list. At this point, when there is a prediction region merge candidate the same as the current prediction region merge candidate, the prediction region merge candidate the same as the current prediction region merge candidate may be deleted, and a largest index may be assigned to the current prediction region merge candidate.

Features briefly summarized above with respect to the present disclosure are merely exemplary aspects of the detailed description of the present disclosure that will be described below, and do not limit the scope of the present disclosure.

According to the present disclosure, inter prediction efficiency can be improved by providing a method of deriving a merge candidate using a prediction region motion information list.

According to the present disclosure, inter prediction efficiency can be improved by simplifying the redundancy check between a prediction region merge candidate and a merge candidate.

According to the present disclosure, inter prediction efficiency can be improved by providing a method of deriving merge candidates of blocks included in a merge processing area.

The effects that can be obtained from the present disclosure are not limited to the effects mentioned above, and unmentioned other effects may be clearly understood by those skilled in the art from the following description.

BRIEF DESCRIPTION OF THE DRAWINGS

FIG. 30 is a view showing an example in which an encoding region merge candidate having address information the same as that of the current block is set to be unavailable as a merge candidate of the current block.

FIG. 31 is a view showing an example in which an encoding region merge candidate having address information the same as that of the current block is set to be unavailable as a merge candidate of the current block.

DETAILED DESCRIPTION

Hereafter, an embodiment of the present disclosure will be described in detail with reference to the accompanying drawings.

Encoding and decoding of a video is performed by the unit of block. For example, an encoding/decoding process such as transform, quantization, prediction, in-loop filtering, reconstruction or the like may be performed on a coding block, a transform block, or a prediction block.

Hereinafter, a block to be encoded/decoded will be referred to as a 'current block'. For example, the current block may represent a coding block, a transform block or a prediction block according to a current encoding/decoding process step.

In addition, it may be understood that the term 'unit' used in this specification indicates a basic unit for performing a specific encoding/decoding process, and the term 'block' indicates a sample array of a predetermined size. Unless otherwise stated, the 'block' and 'unit' may be used to have the same meaning. For example, in an embodiment described below, it may be understood that a coding block and a coding unit have the same meaning.

Figure 1:
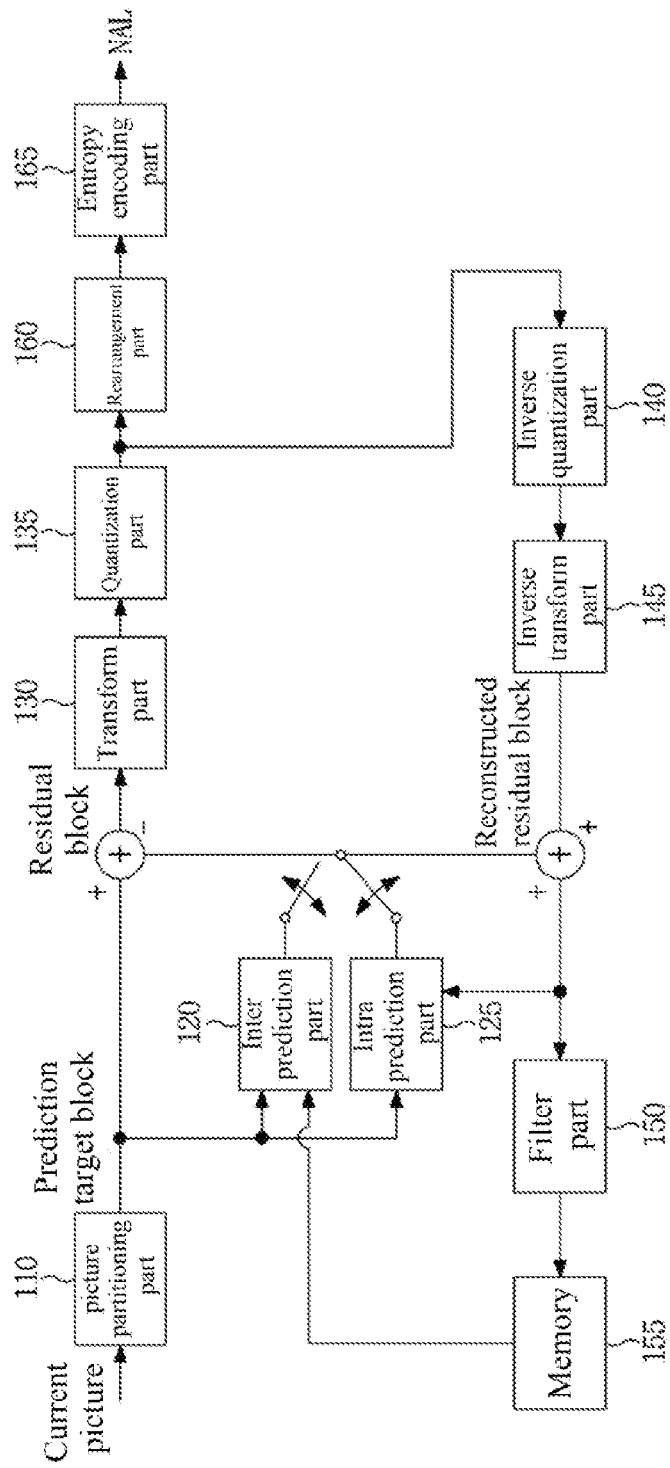
FIG. 1 is a block diagram showing a video encoder according to an embodiment of the present disclosure.

FIG. 1 is a block diagram showing a video encoder according to an embodiment of the present disclosure.

Referring to FIG. 1, a video encoding apparatus 100 may include a picture partitioning part 110, a prediction part 120 and 125, a transform part 130, a quantization part 135, a rearrangement part 160, an entropy coding part 165, an inverse quantization part 140, an inverse transform part 145, a filter part 150, and a memory 155.

Each of the components shown in FIG. 1 is independently shown to represent characteristic functions different from each other in a video encoding apparatus, and it does not mean that each component is formed by the configuration unit of separate hardware or single software. That is, each component is included to be listed as a component for convenience of explanation, and at least two of the components may be combined to form a single component, or one component may be divided into a plurality of components to perform a function. Integrated embodiments and separate embodiments of the components are also included in the scope of the present disclosure if they do not depart from the essence of the present disclosure.

In addition, some of the components are not essential components that perform essential functions in the present disclosure, but may be optional components only for improving performance. The present disclosure can be implemented by including only components essential to implement the essence of the present disclosure excluding components used for improving performance, and a structure including only the essential components excluding the optional components used for improving performance is also included in the scope of the present disclosure.

The picture partitioning part 110 may partition an input picture into at least one processing unit. At this point, the processing unit may be a prediction unit (PU), a transform unit (TU), or a coding unit (CU). The picture partitioning part 110 may partition a picture into a combination of a plurality of coding units, prediction units, and transform units, and encode a picture by selecting a combination of a coding unit, a prediction unit, and a transform unit based on a predetermined criterion (e.g., a cost function).

For example, one picture may be partitioned into a plurality of coding units. In order to partition the coding units in a picture, a recursive tree structure such as a quad tree structure may be used. A coding unit partitioned in different coding units using a video or the largest coding unit as a root may be partitioned to have as many child nodes as the number of partitioned coding units. A coding unit that is not partitioned any more according to a predetermined restriction become a leaf node. That is, when it is assumed that only square partitioning is possible for one coding unit, the one coding unit may be partitioned into up to four different coding units.

Hereinafter, in an embodiment of the present disclosure, the coding unit may be used as a meaning of a unit performing encoding or a meaning of a unit performing decoding.

The prediction unit may be one that is partitioned in a shape of at least one square, rectangle or the like of the same size within one coding unit, or it may be any one prediction unit, among the prediction units partitioned within one coding unit, that is partitioned to have a shape and/or size different from those of another prediction unit.

If the coding unit is not a smallest coding unit when a prediction unit that performs intra prediction based on the coding unit is generated, intra prediction may be performed without partitioning a picture into a plurality of prediction units N×N.

The prediction part 120 and 125 may include an inter prediction part 120 that performs inter prediction and an intra prediction part 125 that performs intra prediction. It may be determined whether to use inter prediction or to perform intra prediction for a prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. A residual coefficient (residual block) between the generated prediction block and the original block may be input into the transform part 130. In addition, prediction mode information, motion vector information and the like used for prediction may be encoded by the entropy coding part 165 together with the residual coefficient and transferred to a decoder. When a specific encoding mode is used, an original block may be encoded as it is and transmitted to a decoder without generating a prediction block through the prediction part 120 and 125. Here, the inter prediction part 120 and the intra prediction part 125 may be implemented as hardware circuits. Alternatively, the inter prediction part 120 and the intra prediction part 125 may be implemented as software instructions stored in a memory and executed by a processor.

The inter prediction part 120 may predict a prediction unit based on information on at least one picture among pictures before or after the current picture, and in some cases, it may predict a prediction unit based on information on a partial area that has been encoded in the current picture. The inter prediction part 120 may include a reference picture interpolation part, a motion prediction part, and a motion compensation part.

The reference picture interpolation part may receive reference picture information from the memory 155 and generate sample information of an integer number of samples or less from the reference picture. In the case of a luminance sample, a DCT-based 8-tap interpolation filter with a varying filter coefficient may be used to generate sample information of an integer number of samples or less by the unit of ¼ samples. In the case of a color difference signal, a DCT-based 4-tap interpolation filter with a varying filter coefficient may be used to generate sample information of an integer number of samples or less by the unit of ⅛ samples.

The motion prediction part may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½ or ¼ samples based on interpolated samples. The motion prediction part may predict a current prediction unit by varying the motion prediction method. Various methods such as a skip method, a merge method, an advanced motion vector prediction (AMVP) method, an intra-block copy method and the like may be used as the motion prediction method.

The intra prediction part 125 may generate a prediction unit based on the information on reference samples around the current block, which is sample information in the current picture. When a block in the neighborhood of the current prediction unit is a block on which inter prediction has been performed and thus the reference sample is a sample on which inter prediction has been performed, the reference sample included in the block on which inter prediction has been performed may be used in place of reference sample information of a block in the neighborhood on which intra prediction has been performed. That is, when a reference sample is unavailable, at least one reference sample among available reference samples may be used in place of unavailable reference sample information.

In the intra prediction, the prediction mode may have an angular prediction mode that uses reference sample information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information.

If the size of the prediction unit is the same as the size of the transform unit when intra prediction is performed, the intra prediction may be performed for the prediction unit based on a sample on the left side, a sample on the top-left side, and a sample on the top of the prediction unit. However, if the size of the prediction unit is different from the size of the transform unit when the intra prediction is performed, the intra prediction may be performed using a reference sample based on the transform unit. In addition, intra prediction using N×N partitioning may be used only for the smallest coding unit.

The intra prediction method may generate a prediction block after applying an Adaptive Intra Smoothing (AIS) filter to the reference sample according to a prediction mode. The type of the AIS filter applied to the reference sample may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by performing entropy coding.

In addition, a residual block including a prediction unit that has performed prediction based on the prediction unit generated by the prediction part 120 and 125 and residual coefficient information, which is a difference value of the prediction unit with the original block, may be generated. The generated residual block may be input into the transform part 130.

The transform part 130 may transform the residual block including the original block and the residual coefficient information of the prediction unit generated through the prediction part 120 and 125 using a transform method such as Discrete Cosine Transform (DCT) or Discrete Sine Transform (DST). Here, the DCT transform core includes at least one among DCT2 and DCT8, and the DST transform core includes DST7. Whether to apply DCT or DST to transform the residual block may be determined based on intra prediction mode information of a prediction unit used to generate the residual block. The transform on the residual block may be skipped. A flag indicating whether to skip the transform on the residual block may be encoded. The transform skip may be allowed for a residual block having a size smaller than or equal to a threshold, a luma component, or a chroma component under the 4:4:4 format.

The quantization part 135 may quantize values transformed into the frequency domain by the transform part 130. Quantization coefficients may vary according to the block or the importance of a video. A value calculated by the quantization part 135 may be provided to the inverse quantization part 140 and the rearrangement part 160.

The rearrangement part 160 may rearrange coefficient values for the quantized residual coefficients.

The rearrangement part 160 may change coefficients of a two-dimensional block shape into a one-dimensional vector shape through a coefficient scanning method. For example, the rearrangement part 160 may scan DC coefficients up to high-frequency domain coefficients using a zig-zag scan method, and change the coefficients into a one-dimensional vector shape. According to the size of the transform unit and the intra prediction mode, a vertical scan of scanning the coefficients of a two-dimensional block shape in the column direction and a horizontal scan of scanning the coefficients of a two-dimensional block shape in the row direction may be used instead of the zig-zag scan. That is, according to the size of the transform unit and the intra prediction mode, a scan method that will be used may be determined among the zig-zag scan, the vertical direction scan, and the horizontal direction scan.

The entropy coding part 165 may perform entropy coding based on values calculated by the rearrangement part 160. Entropy coding may use various encoding methods such as Exponential Golomb, Context-Adaptive Variable Length Coding (CAVLC), Context-Adaptive Binary Arithmetic Coding (CABAC), and the like.

The entropy coding part 165 may encode various information such as residual coefficient information and block type information of a coding unit, prediction mode information, partitioning unit information, prediction unit information, motion vector information, reference frame information, block interpolation information, and filtering information input from the rearrangement part 160 and the prediction pars 120 and 125.

The entropy coding part 165 may entropy-encode the coefficient value of a coding unit input from the rearrangement part 160.

The inverse quantization part 140 and the inverse transform part 145 inverse-quantize the values quantized by the quantization part 135 and inverse-transform the values transformed by the transform part 130. The residual coefficient generated by the inverse quantization part 140 and the inverse transform part 145 may be combined with the prediction unit predicted through a motion estimation part, a motion compensation part, and an intra prediction part included in the prediction part 120 and 125 to generate a reconstructed block.

The filter part 150 may include at least one among a deblocking filter, an offset correction unit, and an adaptive loop filter (ALF).

The deblocking filter may remove block distortion generated by the boundary between blocks in the reconstructed picture. In order to determine whether to perform deblocking, whether to apply the deblocking filter to the current block may be determined based on the samples included in several columns or rows included in the block. A strong filter or a weak filter may be applied according to the deblocking filtering strength needed when the deblocking filter is applied to a block. In addition, when vertical direction filtering and horizontal direction filtering are performed in applying the deblocking filter, horizontal direction filtering and vertical direction filtering may be processed in parallel.

The offset correction unit may correct an offset to the original video by the unit of sample for a video on which the deblocking has been performed. In order to perform offset correction for a specific picture, it is possible to use a method of dividing samples included in the video into a certain number of areas, determining an area to perform offset, and applying the offset to the area, or a method of applying an offset in consideration of edge information of each sample.

Adaptive Loop Filtering (ALF) may be performed based on a value obtained by comparing the reconstructed and filtered video and the original video. After dividing the samples included in the video into predetermined groups, one filter to be applied to a corresponding group may be determined, and filtering may be performed differently for each group. A luminance signal, which is the information related to whether to apply ALF, may be transmitted for each coding unit (CU), and the shape and filter coefficient of an ALF filter to be applied may vary according to each block. In addition, an ALF filter of the same type (fixed type) may be applied regardless of the characteristic of a block to be applied.

The memory 155 may store the reconstructed block or picture calculated through the filter part 150, and the reconstructed and stored block or picture may be provided to the prediction part 120 and 125 when inter prediction is performed.

Figure 2:
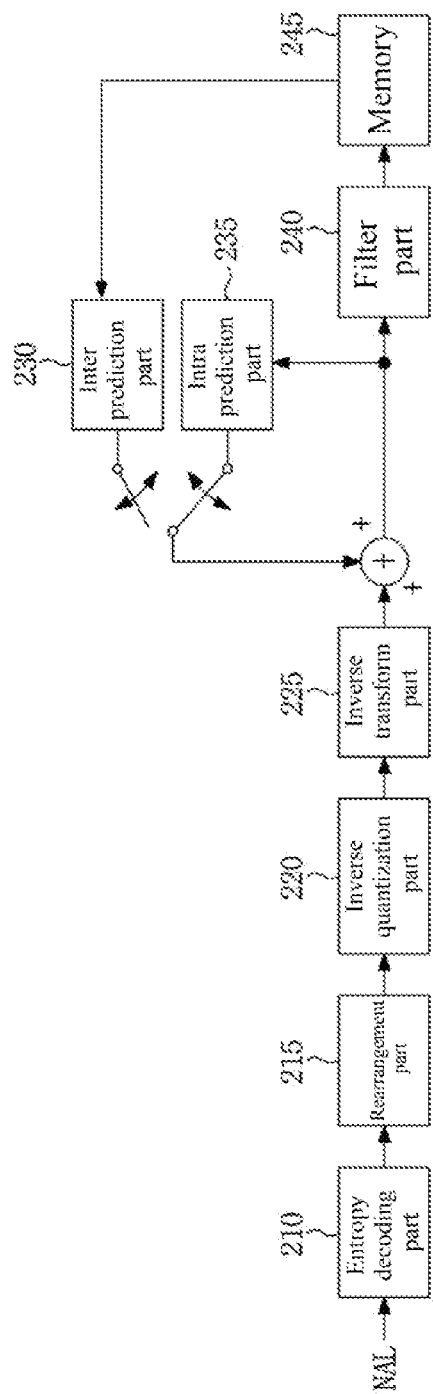
FIG. 2 is a block diagram showing a video decoder according to an embodiment of the present disclosure.

FIG. 2 is a block diagram showing a video decoder according to an embodiment of the present disclosure.

Referring to FIG. 2, a video decoder 200 may include an entropy decoding part 210, a rearrangement part 215, an inverse quantization part 220, an inverse transform part 225, a prediction part 230 and 235, a filter part 240, and a memory 245.

When a video bitstream is input from a video encoder, the input bitstream may be decoded in a procedure opposite to that of the video encoder.

The entropy decoding part 210 may perform entropy decoding in a procedure opposite to that of performing entropy coding in the entropy decoding part of the video encoder. For example, various methods corresponding to the method performed by the video encoder, such as Exponential Golomb, Context-Adaptive Variable Length Coding (CAVLC), and Context-Adaptive Binary Arithmetic Coding (CABAC), may be applied.

The entropy decoding part 210 may decode information related to intra prediction and inter prediction performed by the encoder.

The rearrangement part 215 may perform rearrangement on the bitstream entropy-decoded by the entropy decoding part 210 based on the rearrangement method performed by the encoder. The coefficients expressed in a one-dimensional vector shape may be reconstructed and rearranged as coefficients of two-dimensional block shape. The rearrangement part 215 may receive information related to coefficient scanning performed by the encoding part and perform reconstruction through a method of inverse-scanning based on the scanning order performed by the corresponding encoding part.

The inverse quantization part 220 may perform inverse quantization based on a quantization parameter provided by the encoder and a coefficient value of the rearranged block.

The inverse transform part 225 may perform inverse transform on the transform, i.e., DCT or DST, performed by the transform part on a result of the quantization performed by the video encoder, i.e., inverse DCT or inverse DST. Here, the DCT transform core may include at least one among DCT2 and DCT8, and the DST transform core may include DST7. Alternatively, when the transform is skipped in the video encoder, even the inverse transform part 225 may not perform the inverse transform. The inverse transform may be performed based on a transmission unit determined by the video encoder. The inverse transform part 225 of the video decoder may selectively perform a transform technique (e.g., DCT or DST) according to a plurality of pieces of information such as a prediction method, a size of a current block, a prediction direction and the like.

The prediction part 230 and 235 may generate a prediction block based on information related to generation of a prediction block provided by the entropy decoder 210 and information on a previously decoded block or picture provided by the memory 245.

As described above, if the size of the prediction unit and the size of the transform unit are the same when intra prediction is performed in the same manner as the operation of the video encoder, intra prediction is performed on the prediction unit based on the sample existing on the left side, the sample on the top-left side, and the sample on the top of the prediction unit. However, if the size of the prediction unit and the size of the transform unit are different when intra prediction is performed, intra prediction may be performed using a reference sample based on a transform unit. In addition, intra prediction using N×N partitioning may be used only for the smallest coding unit.

The prediction part 230 and 235 may include a prediction unit determination part, an inter prediction part, and an intra prediction part. The prediction unit determination part may receive various information such as prediction unit information input from the entropy decoding part 210, prediction mode information of the intra prediction method, information related to motion prediction of an inter prediction method, and the like, identify the prediction unit from the current coding unit, and determine whether the prediction unit performs inter prediction or intra prediction. The inter prediction part 230 may perform inter prediction on the current prediction unit based on information included in at least one picture among pictures before or after the current picture including the current prediction unit by using information necessary for inter prediction of the current prediction unit provided by the video encoder. Alternatively, the inter prediction part 230 may perform inter prediction based on information on a partial area previously reconstructed in the current picture including the current prediction unit.

In order to perform inter prediction, it may be determined, based on the coding unit, whether the motion prediction method of the prediction unit included in a corresponding coding unit is a skip mode, a merge mode, a motion vector prediction mode (AMVP mode), or an intra-block copy mode.

The intra prediction part 235 may generate a prediction block based on the information on the sample in the current picture. When the prediction unit is a prediction unit that has performed intra prediction, the intra prediction may be performed based on intra prediction mode information of the prediction unit provided by the video encoder. The intra prediction part 235 may include an Adaptive Intra Smoothing (AIS) filter, a reference sample interpolation part, and a DC filter. The AIS filter is a part that performs filtering on the reference sample of the current block, and may determine whether to apply the filter according to the prediction mode of the current prediction unit and apply the filter. AIS filtering may be performed on the reference sample of the current block by using the prediction mode and AIS filter information of the prediction unit provided by the video encoder. When the prediction mode of the current block is a mode that does not perform AIS filtering, the AIS filter may not be applied.

When the prediction mode of the prediction unit is a prediction unit that performs intra prediction based on a sample value obtained by interpolating the reference sample, the reference sample interpolation part may generate a reference sample of a sample unit having an integer value or less by interpolating the reference sample. When the prediction mode of the current prediction unit is a prediction mode that generates a prediction block without interpolating the reference sample, the reference sample may not be interpolated. The DC filter may generate a prediction block through filtering when the prediction mode of the current block is the DC mode.

The reconstructed block or picture may be provided to the filter part 240. The filter part 240 may include a deblocking filter, an offset correction unit, and an ALF.

Information on whether a deblocking filter is applied to a corresponding block or picture and information on whether a strong filter or a weak filter is applied when a deblocking filter is applied may be provided by the video encoder. The deblocking filter of the video decoder may be provided with information related to the deblocking filter provided by the video encoder, and the video decoder may perform deblocking filtering on a corresponding block.

The offset correction unit may perform offset correction on the reconstructed video based on the offset correction type and offset value information applied to the video when encoding is performed.

The ALF may be applied to a coding unit based on information on whether to apply the ALF and information on ALF coefficients provided by the encoder. The ALF information may be provided to be included in a specific parameter set.

The memory 245 may store the reconstructed picture or block and use it as a reference picture or a reference block and may provide the reconstructed picture to an output unit.

Figure 3:
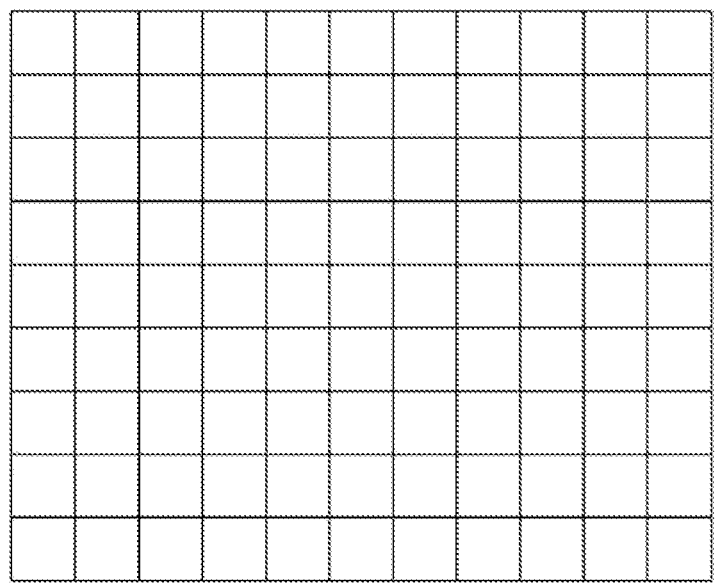
FIG. 3 is a view showing a basic coding tree unit according to an embodiment of the present disclosure.

FIG. 3 is a view showing a basic coding tree unit according to an embodiment of the present disclosure.

A coding block of a maximum size may be defined as a coding tree block. A picture is partitioned into a plurality of coding tree units (CTUs). The coding tree unit is a coding unit having a maximum size and may be referred to as a Large Coding Unit (LCU). FIG. 3 shows an example in which a picture is partitioned into a plurality of coding tree units.

The size of the coding tree unit may be defined at a picture level or a sequence level. To this end, information indicating the size of the coding tree unit may be signaled through a picture parameter set or a sequence parameter set.

For example, the size of the coding tree unit for the entire picture in a sequence may be set to 128×128. Alternatively, at the picture level, any one among 128×128 and 256×256 may be determined as the size of the coding tree unit. For example, the size of the coding tree unit may be set to 128×128 in a first picture, and the size of the coding tree unit may be set to 256×256 in a second picture.

Coding blocks may be generated by partitioning a coding tree unit. The coding block indicates a basic unit for performing encoding/decoding. For example, prediction or transform may be performed for each coding block, or a prediction encoding mode may be determined for each coding block. Here, the prediction encoding mode indicates a method of generating a prediction video. For example, the prediction encoding mode may include prediction within a screen (intra prediction), prediction between screens (inter prediction), current picture referencing (CPR) or intra-block copy (IBC), or combined prediction. For the coding block, a prediction block may be generated by using at least one prediction encoding mode among the intra prediction, the inter prediction, the current picture referencing, and the combined prediction.

Information indicating the prediction encoding mode of the current block may be signaled through a bitstream. For example, the information may be a 1-bit flag indicating whether the prediction encoding mode is an intra mode or an inter mode. Only when the prediction encoding mode of the current block is determined as the inter mode, the current picture referencing or the combined prediction may be used.

The current picture reference is for setting the current picture as a reference picture and obtaining a prediction block of the current block from an area that has already been encoded/decoded in the current picture. Here, the current picture means a picture including the current block. Information indicating whether the current picture reference is applied to the current block may be signaled through a bitstream. For example, the information may be a 1-bit flag. When the flag is true, the prediction encoding mode of the current block may be determined as the current picture reference, and when the flag is false, the prediction mode of the current block may be determined as inter prediction.

Alternatively, the prediction encoding mode of the current block may be determined based on a reference picture index. For example, when the reference picture index indicates the current picture, the prediction encoding mode of the current block may be determined as the current picture reference. When the reference picture index indicates a picture other than the current picture, the prediction encoding mode of the current block may be determined as inter prediction. That is, the current picture reference is a prediction method using information on an area in which encoding/decoding has been completed in the current picture, and inter prediction is a prediction method using information on another picture in which the encoding/decoding has been completed.

The combined prediction represents an encoding mode in which two or more among the intra prediction, the inter prediction, and the current picture referencing are combined. For example, when the combined prediction is applied, a first prediction block may be generated based on one among the intra prediction, the inter prediction, and the current picture referencing, and a second prediction block may be generated based on another one. When the first prediction block and the second prediction block are generated, a final prediction block may be generated through an average operation or a weighted sum operation of the first prediction block and the second prediction block. Information indicating whether the combined prediction is applied may be signaled through a bitstream. The information may be a 1-bit flag.

Figure 4:
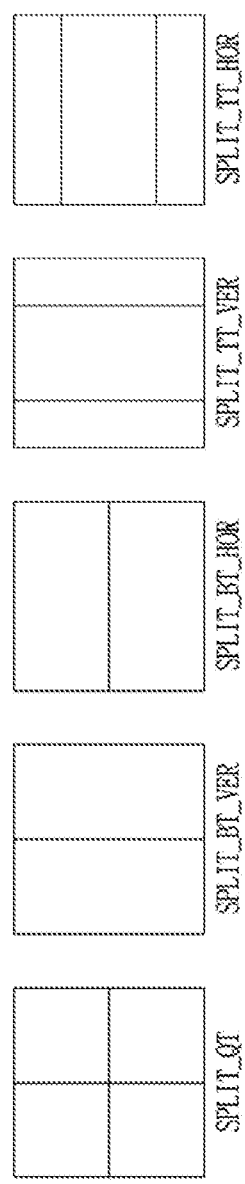
FIG. 4 is a view showing various partition types of a coding block.

FIG. 4 is a view showing various partition types of a coding block.

The coding block may be partitioned into a plurality of coding blocks based on quad tree partitioning, binary tree partitioning, or triple tree partitioning. The partitioned coding block may be partitioned again into a plurality of coding blocks based on the quad tree partitioning, the binary tree partitioning, or the triple tree partitioning.

The quad tree partitioning refers to a partitioning technique that partitions a current block into four blocks. As a result of the quad tree partitioning, the current block may be partitioned into four square-shaped partitions (see 'SPLIT_QT' of FIG. 4(a)).

The binary tree partitioning refers to a partitioning technique that partitions a current block into two blocks. Partitioning a current block into two blocks along the vertical direction (i.e., using a vertical line crossing the current block) may be referred to as vertical direction binary tree partitioning, and partitioning a current block into two blocks along the horizontal direction (i.e., using a horizontal line crossing the current block) may be referred to as horizontal direction binary tree partitioning. As a result of the binary tree partitioning, the current block may be partitioned into two non-square shaped partitions. 'SPLIT_BT_VER' of FIG. 4(b) shows a result of the vertical direction binary tree partitioning, and 'SPLIT_BT_HOR' of FIG. 4(c) shows a result of the horizontal direction binary tree partitioning.

The triple tree partitioning refers to a partitioning technique that partitions a current block into three blocks. Partitioning a current block into three blocks along the vertical direction (i.e., using two vertical lines crossing the current block) may be referred to as vertical direction triple tree partitioning, and partitioning a current block into three blocks along the horizontal direction (i.e., using two horizontal lines crossing the current block) may be referred to as horizontal direction triple tree partitioning. As a result of the triple tree partitioning, the current block may be partitioned into three non-square shaped partitions. At this point, the width/height of a partition positioned at the center of the current block may be twice as large as the width/height of the other partitions. 'SPLIT_TT_VER' of FIG. 4(d) shows a result of the vertical direction triple tree partitioning, and 'SPLIT_TT_HOR' of FIG. 4(e) shows a result of the horizontal direction triple tree partitioning.

The number of times of partitioning a coding tree unit may be defined as a partitioning depth. The maximum partitioning depth of a coding tree unit may be determined at the sequence or picture level. Accordingly, the maximum partitioning depth of a coding tree unit may be different for each sequence or picture.

Alternatively, the maximum partitioning depth for each partitioning technique may be individually determined. For example, the maximum partitioning depth allowed for the quad tree partitioning may be different from the maximum partitioning depth allowed for the binary tree partitioning and/or the triple tree partitioning.

The encoder may signal information indicating at least one among the partitioning type and the partitioning depth of the current block through a bitstream. The decoder may determine the partitioning type and the partitioning depth of a coding tree unit based on the information parsed from the bitstream.

Figure 5:
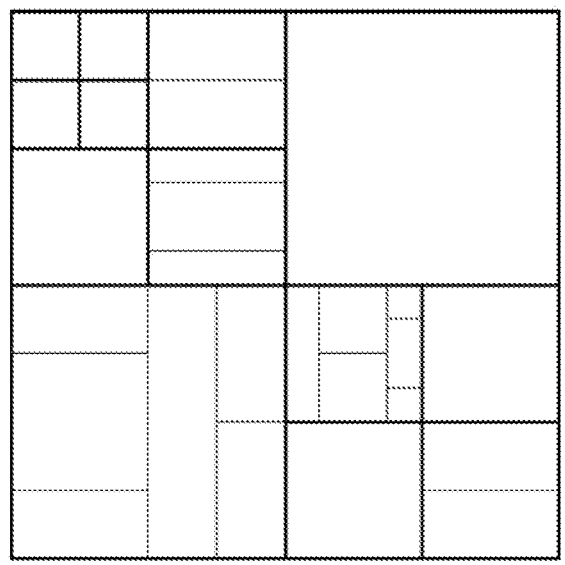
FIG. 5 is a view showing a partitioning pattern of a coding tree unit.

FIG. 5 is a view showing a partitioning pattern of a coding tree unit.

Partitioning a coding block using a partitioning technique such as quad tree partitioning, binary tree partitioning, and/or triple tree partitioning may be referred to as multi-tree partitioning.

Coding blocks generated by applying the multi-tree partitioning to a coding block may be referred to as lower coding blocks. When the partitioning depth of a coding block is k, the partitioning depth of the lower coding blocks is set to k+1.

Contrarily, for coding blocks having a partitioning depth of k+1, a coding block having a partitioning depth of k may be referred to as an upper coding block.

The partitioning type of the current coding block may be determined based on at least one among a partitioning type of an upper coding block and a partitioning type of a neighboring coding block. Here, the neighboring coding block is a coding block adjacent to the current coding block and may include at least one among a top neighboring block and a left neighboring block of the current coding block, and a neighboring block adjacent to the top-left corner. Here, the partitioning type may include at least one among whether a quad tree partitioning, whether a binary tree partitioning, binary tree partitioning direction, whether a triple tree partitioning, and triple tree partitioning direction.

In order to determine a partitioning type of a coding block, information indicating whether the coding block can be partitioned may be signaled through a bitstream. The information is a 1-bit flag of 'split_cu_flag', and when the flag is true, it indicates that the coding block is partitioned by a head (→quad) tree partitioning technique.

When split_cu_flag is true, information indicating whether the coding block is quad-tree partitioned may be signaled through a bitstream. The information is a 1-bit flag of split_qt_flag, and when the flag is true, the coding block may be partitioned into four blocks.

For example, in the example shown in FIG. 5, as a coding tree unit is quad-tree partitioned, four coding blocks having a partitioning depth of 1 are generated. In addition, it is shown that quad tree partitioning is applied again to the first and fourth coding blocks among the four coding blocks generated as a result of the quad tree partitioning. As a result, four coding blocks having a partitioning depth of 2 may be generated.

In addition, coding blocks having a partitioning depth of 3 may be generated by applying the quad tree partitioning again to a coding block having a partitioning depth of 2.

When quad tree partitioning is not applied to the coding block, whether binary tree partitioning or triple tree partitioning is performed on the coding block may be determined in consideration of at least one among the size of the coding block, whether the coding block is positioned at the picture boundary, the maximum partitioning depth, and the partitioning type of a neighboring block. When it is determined to perform binary tree partitioning or triple tree partitioning on the coding block, information indicating the partitioning direction may be signaled through a bitstream. The information may be a 1-bit flag of mtt_split_cu_vertical_flag. Based on the flag, whether the partitioning direction is a vertical direction or a horizontal direction may be determined. Additionally, information indicating whether binary tree partitioning or triple tree partitioning is applied to the coding block may be signaled through a bitstream. The information may be a 1-bit flag of mtt_split_cu_binary_flag. Based on the flag, whether binary tree partitioning or triple tree partitioning is applied to the coding block may be determined.

For example, in the example shown in FIG. 5, it is shown that vertical direction binary tree partitioning is applied to a coding block having a partitioning depth of 1, vertical direction triple tree partitioning is applied to the left-side coding block among the coding blocks generated as a result of the partitioning, and vertical direction binary tree partitioning is applied to the right-side coding block.

Inter prediction is a prediction encoding mode that predicts a current block by using information of a previous picture. For example, a block at the same position as the current block in the previous picture (hereinafter, a collocated block) may be set as the prediction block of the current block. Hereinafter, a prediction block generated based on a block at the same position as the current block will be referred to as a collocated prediction block.

On the other hand, when an object existing in the previous picture has moved to another position in the current picture, the current block may be effectively predicted by using a motion of the object. For example, when the moving direction and the size of an object can be known by comparing the previous picture and the current picture, a prediction block (or a prediction video) of the current block may be generated in consideration of motion information of the object. Hereinafter, the prediction block generated using motion information may be referred to as a motion prediction block.

A residual block may be generated by subtracting the prediction block from the current block. At this point, when there is a motion of an object, the energy of the residual block may be reduced by using the motion prediction block instead of the collocated prediction block, and therefore, compression performance of the residual block can be improved.

As described above, generating a prediction block by using motion information may be referred to as motion compensation prediction. In most inter prediction, a prediction block may be generated based on the motion compensation prediction.

The motion information may include at least one among a motion vector, a reference picture index, a prediction direction, and a bidirectional weight index. The motion vector represents the moving direction and the size of an object. The reference picture index specifies a reference picture of the current block among reference pictures included in a reference picture list. The prediction direction indicates any one among unidirectional L0 prediction, unidirectional L1 prediction, and bidirectional prediction (L0 prediction and L1 prediction). According to the prediction direction of the current block, at least one among motion information in the L0 direction and motion information in the L1 direction may be used. The bidirectional weight index specifies a weighting value applied to a L0 prediction block and a weighting value applied to a L1 prediction block.

Figure 6:
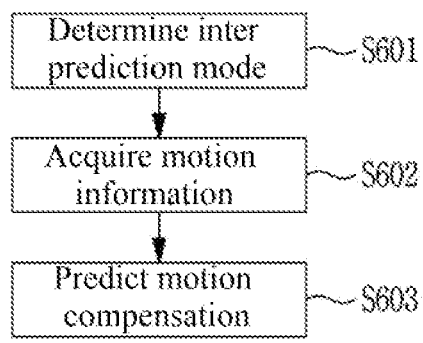
FIG. 6 is a flowchart showing an inter prediction method according to an embodiment of the present disclosure.

FIG. 6 is a flowchart showing an inter prediction method according to an embodiment of the present disclosure.

Referring to FIG. 6, the inter prediction method includes the steps of determining an inter prediction mode of a current block (S601), acquiring motion information of the current block according to the determined inter prediction mode (S602), and performing motion compensation prediction for the current block based on the acquired motion information (S603).

Here, the inter prediction mode represents various techniques for determining motion information of the current block, and may include an inter prediction mode that uses translational motion information and an inter prediction mode that uses affine motion information. For example, the inter prediction mode using translational motion information may include a merge mode and a motion vector prediction mode, and the inter prediction mode using affine motion information may include an affine merge mode and an affine motion vector prediction mode. The motion information of the current block may be determined based on a neighboring block adjacent to the current block or information parsed from a bitstream according to the inter prediction mode.

Hereinafter, the inter prediction method using affine motion information will be described in detail.

Figure 7:
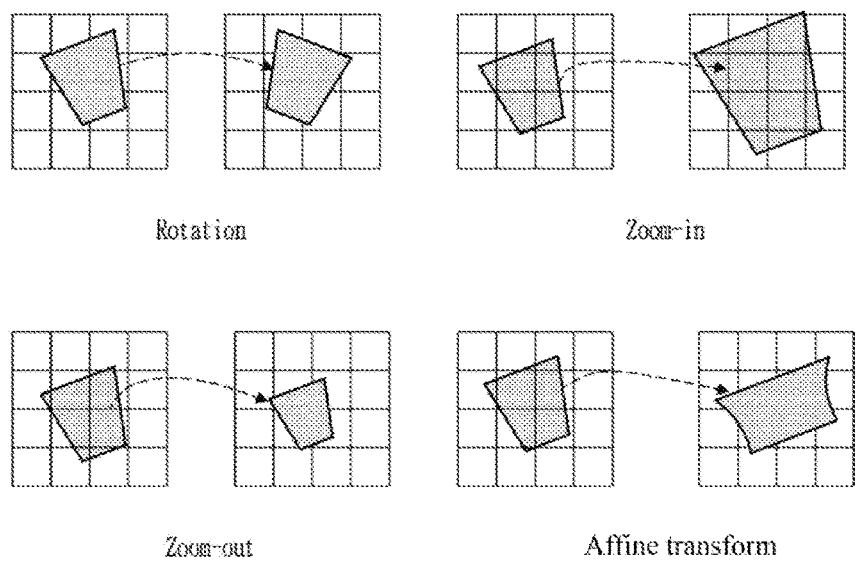
FIG. 7 is a view showing a nonlinear motion of an object.

FIG. 7 is a view showing a nonlinear motion of an object.

A nonlinear motion of an object may be generated in a video. For example, as shown in the example of FIG. 7, a nonlinear motion of an object, such as zoom-in, zoom-out, rotation, affine transform or the like of a camera, may occur. When a nonlinear motion of an object occurs, the motion of the object cannot be effectively expressed with a translational motion vector. Accordingly, encoding efficiency can be improved by using an affine motion instead of a translational motion in an area where a nonlinear motion of an object occurs.

Figure 8:
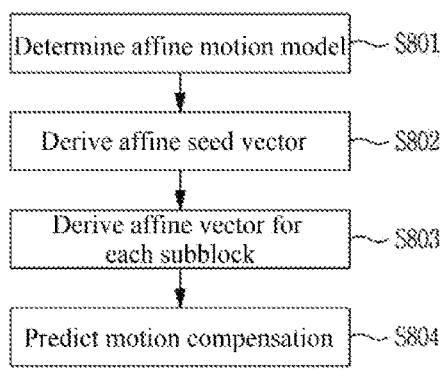
FIG. 8 is a flowchart showing an inter prediction method based on an affine motion according to an embodiment of the present disclosure.

FIG. 8 is a flowchart showing an inter prediction method based on an affine motion according to an embodiment of the present disclosure.

Whether an inter prediction technique based on an affine motion is applied to the current block may be determined based on the information parsed from a bitstream. Specifically, whether the inter prediction technique based on an affine motion is applied to the current block may be determined based on at least one among a flag indicating whether the affine merge mode is applied to the current block and a flag indicating whether the affine motion vector prediction mode is applied to the current block.

When the inter prediction technique based on an affine motion is applied to the current block, an affine motion model of the current block may be determined (S801). The affine motion model may be determined as at least one among a six-parameter affine motion model and a four-parameter affine motion model. The six-parameter affine motion model expresses an affine motion using six parameters, and the four-parameter affine motion model expresses an affine motion using four parameters.

Equation 1 expresses an affine motion using six parameters. The affine motion represents a translational motion for a predetermined area determined by affine seed vectors.

$$v_x = ax - by + e$$

$$v_y = cx + dy + f \qquad \text{[Equation 1]}$$

When an affine motion is expressed using six parameters, a complicated motion can be expressed. However, as the number of bits required for encoding each of the parameters increases, encoding efficiency may be lowered. Accordingly, the affine motion may be expressed using four parameters. Equation 2 expresses an affine motion using four parameters.

$$v_x = ax - by + e$$

$$v_y = bx + ay + f \qquad \text{[Equation 2]}$$

Information for determining an affine motion model of the current block may be encoded and signaled through a bitstream. For example, the information may be a 1-bit flag of 'affine_type_flag'. When the value of the flag is 0, it may indicate that a 4-parameter affine motion model is applied, and when the value of the flag is 1, it may indicate that a 6-parameter affine motion model is applied. The flag may be encoded by the unit of slice, tile, or block (e.g., by the unit of coding block or coding tree). When a flag is signaled at the slice level, an affine motion model determined at the slice level may be applied to all blocks belonging to the slice.

Alternatively, an affine motion model of the current block may be determined based on an affine inter prediction mode of the current block. For example, when the affine merge mode is applied, the affine motion model of the current block may be determined as a 4-parameter motion model. On the other hand, when the affine motion vector prediction mode is applied, information for determining the affine motion model of the current block may be encoded and signaled through a bitstream. For example, when the affine motion vector prediction mode is applied to the current block, the affine motion model of the current block may be determined based on the 1-bit flag of 'affine_type_flag'.

Next, an affine seed vector of the current block may be derived (S802). When a 4-parameter affine motion model is selected, motion vectors at two control points of the current block may be derived. On the other hand, when a 6-parameter affine motion model is selected, motion vectors at three control points of the current block may be derived. The motion vector at a control point may be referred to as an affine seed vector. The control point may include at least one among the top-left corner, the top-right corner, and the bottom-left corner of the current block.

Figure 9:
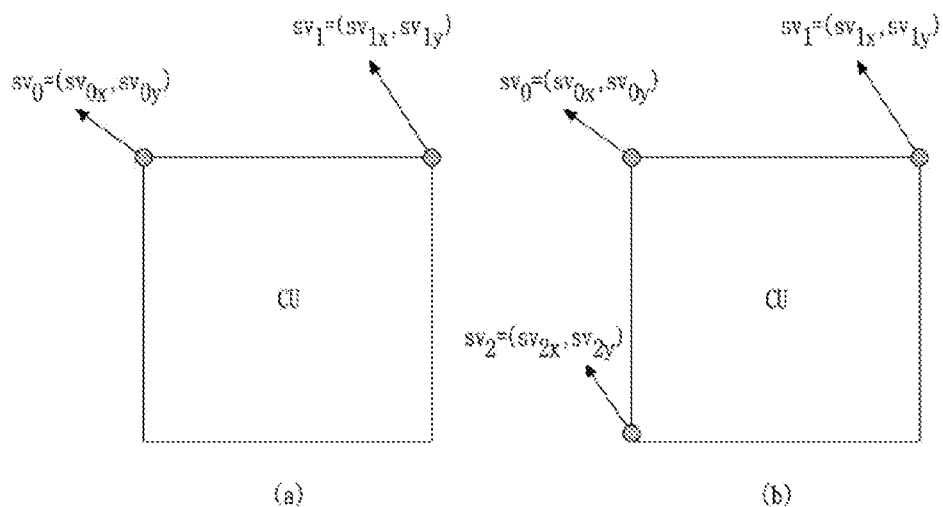
FIG. 9 is a view showing an example of affine seed vectors of each affine motion model.

FIG. 9 is a view showing an example of affine seed vectors of each affine motion model.

In the 4-parameter affine motion model, affine seed vectors may be derived for two among the top-left corner, the top-right corner, and the bottom-left corner. For example, as shown in the example of FIG. 9(a), when a 4-parameter affine motion model is selected, an affine vector may be derived using the affine seed vector $sv_0$ for the top-left corner of the current block (e.g., top-left sample (x1, y1)) and the affine seed vector $sv_1$ for the top-right corner of the current block (e.g., the top-right sample (x1, y1)). It is also possible to use an affine seed vector for the bottom-left corner instead of the affine seed vector for the top-left corner, or use an affine seed vector for the bottom-left corner instead of the affine seed vector for the top-right corner.

In the 6-parameter affine motion model, affine seed vectors may be derived for the top-left corner, the top-right corner, and the bottom-left corner. For example, as shown in the example of FIG. 9(b), when a 6-parameter affine motion model is selected, an affine vector may be derived using the affine seed vector $sv_0$ for the top-left corner of the current block (e.g., top-left sample (x1, y1)), the affine seed vector $sv_1$ for the top-right corner of the current block (e.g., the top-right sample (x1, y1)), and the affine seed vector $sv_2$ for the top-left corner of the current block (e.g., top-left sample (x2, y2)).

In the embodiment described below, in the 4-parameter affine motion model, the affine seed vectors of the top-left control point and the top-right control point will be referred to as a first affine seed vector and a second affine seed vector, respectively. In the embodiments using the first affine seed vector and the second affine seed vector described below, at least one among the first affine seed vector and the second affine seed vector may be replaced by the affine seed vector of the bottom-left control point (a third affine seed vector) or the affine seed vector of the bottom-right control point (a fourth affine seed vector).

In addition, in the 6-parameter affine motion model, the affine seed vectors of the top-left control point, the top-right control point, and the bottom-left control point will be referred to as a first affine seed vector, a second affine seed vector, and a third affine seed vector, respectively. In the embodiments using the first affine seed vector, the second affine seed vector, and the third affine seed vector described below, at least one among the first affine seed vector, the second affine seed vector, and the third affine seed vector may be replaced by the affine seed vector of the bottom-right control point (a fourth affine seed vector).

An affine vector may be derived for each subblock by using the affine seed vectors (S803). Here, the affine vector represents a translational motion vector derived based on the affine seed vectors. The affine vector of a subblock may be referred to as an affine subblock motion vector or a subblock motion vector.

Figure 10:
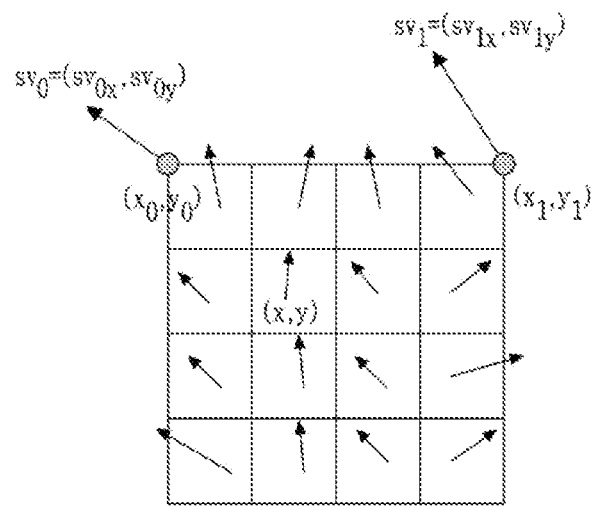
FIG. 10 is a view showing an example of affine vectors of subblocks in a 4-parameter motion model.

FIG. 10 is a view showing an example of affine vectors of subblocks in a 4-parameter motion model.

The affine vector of the subblock may be derived based on the position of the control point, the position of the subblock, and the affine seed vector. For example, Equation 3 shows an example of deriving an affine subblock vector.

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x}$$

$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$

[Equation 3]

In Equation 3, (x, y) denotes the position of a subblock. Here, the position of a subblock indicates the position of a reference sample included in the subblock. The reference sample may be a sample positioned at the top-left corner of the subblock, or a sample of which at least one among the x-axis and y-axis coordinates is a center point. $(x_0, y_0)$ denotes the position of the first control point, and $(sv_{0x}, sv_{0y})$ denotes the first affine seed vector. In addition, $(x_1, y_1)$ denotes the position of the second control point, and $(sv_{1x}, sv_{1y})$ denotes the second affine seed vector.

When the first control point and the second control point correspond to the top-left corner and the top-right corner of the current block respectively, $x_1$-$x_0$ may be set to a value equal to the width of the current block.

Thereafter, motion compensation prediction for each subblock may be performed using the affine vector of each subblock (S804). As a result of performing the motion compensation prediction, a prediction block for each subblock may be generated. The prediction blocks of the subblocks may be set as the prediction blocks of the current block.

Next, an inter prediction method using translational motion information will be described in detail.

Motion information of the current block may be derived from motion information of the current block another block (→another block). Here, another block may be a block encoded/decoded by inter prediction before the current block. Setting the motion information of the current block to be equal to the motion information of another block may be defined as a merge mode. In addition, setting the motion vector of another block as the prediction value of the motion vector of the current block may be defined as a motion vector prediction mode.

Figure 11:
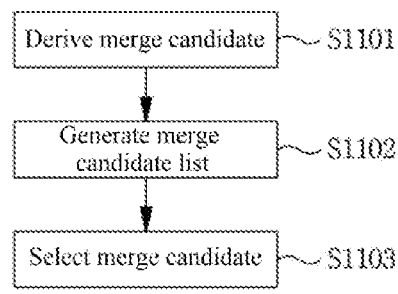
FIG. 11 is a flowchart showing a process of deriving motion information of a current block using a merge mode.

FIG. 11 is a flowchart showing a process of deriving motion information of a current block using a merge mode.

A merge candidate of the current block may be derived (S1101). The merge candidate of the current block may be derived from a block encoded/decoded by inter prediction before the current block.

Figure 12:
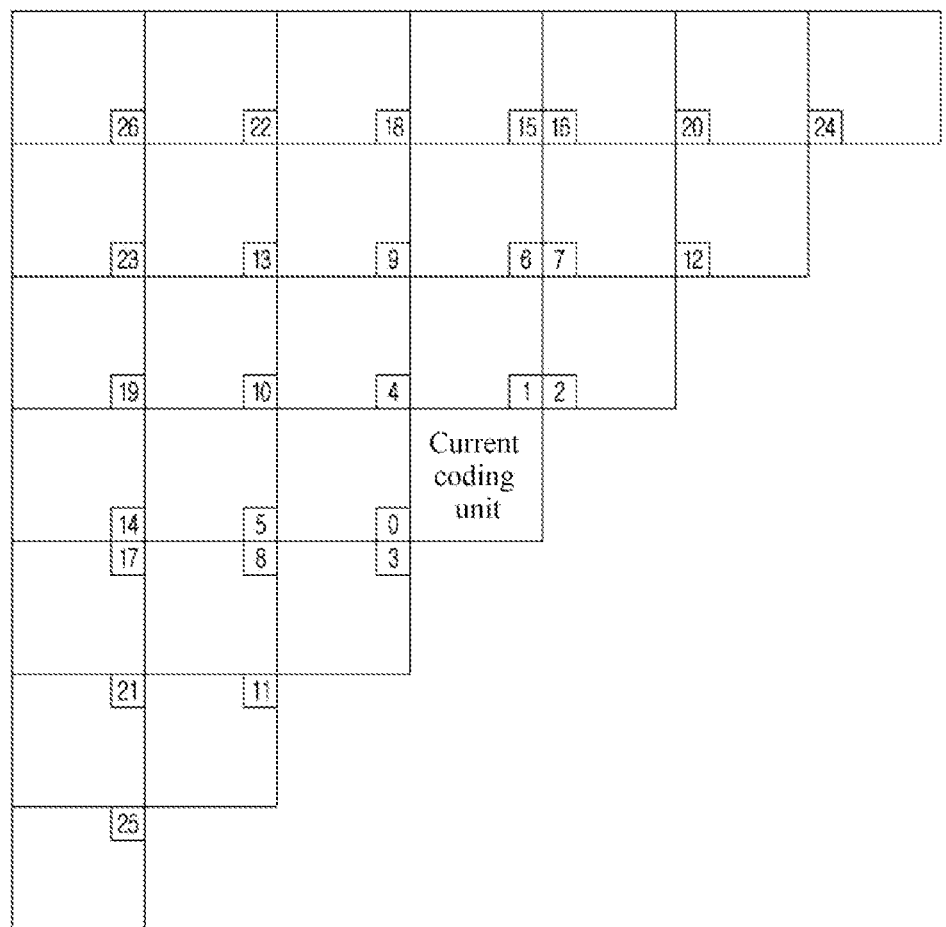
FIG. 12 is a view showing an example of candidate blocks used for deriving a merge candidate.

FIG. 12 is a view showing an example of candidate blocks used for deriving a merge candidate.

The candidate blocks may include at least one among neighboring blocks including a sample adjacent to the current block or non-neighboring blocks including a sample not adjacent to the current block. Hereinafter, samples for determining candidate blocks are defined as reference samples. In addition, a reference sample adjacent to the current block is referred to as a neighboring reference sample, and a reference sample not adjacent to the current block is referred to as a non-neighboring reference sample.

The neighboring reference sample may be included in a neighboring column of the leftmost column of the current block or a neighboring row of the uppermost row of the current block. For example, when the coordinates of the top-left sample of the current block is (0, 0), at least one among a block including a reference sample at the position of (−1, H−1), a block including a reference sample at the position of (W−1, −1), a block including a reference sample at the position of (W, −1), a block including a reference sample at the position of (−1, H), and a block including a reference sample at the position of (−1, −1) may be used as a candidate block. Referring to the drawing, neighboring blocks of index 0 to 4 may be used as candidate blocks.

The non-neighboring reference sample represents a sample of which at least one among an x-axis distance and a y-axis distance from a reference sample adjacent to the current block has a predefined value. For example, at least one among a block including a reference sample of which the x-axis distance from the left reference sample is a predefined value, a block including a non-neighboring sample of which the y-axis distance from the top reference sample is a predefined value, and a block including a non-neighboring sample of which the x-axis distance and the y-axis distance from the top-left reference sample are predefined values may be used as a candidate block. The predefined values may be a natural number such as 4, 8, 12, 16 or the like. Referring to the drawing, at least one among the blocks of index 5 to 26 may be used as a candidate block.

A sample not positioned on the same vertical line, horizontal line, or diagonal line as the neighboring reference sample may be set as a non-neighboring reference sample.

Figure 13:
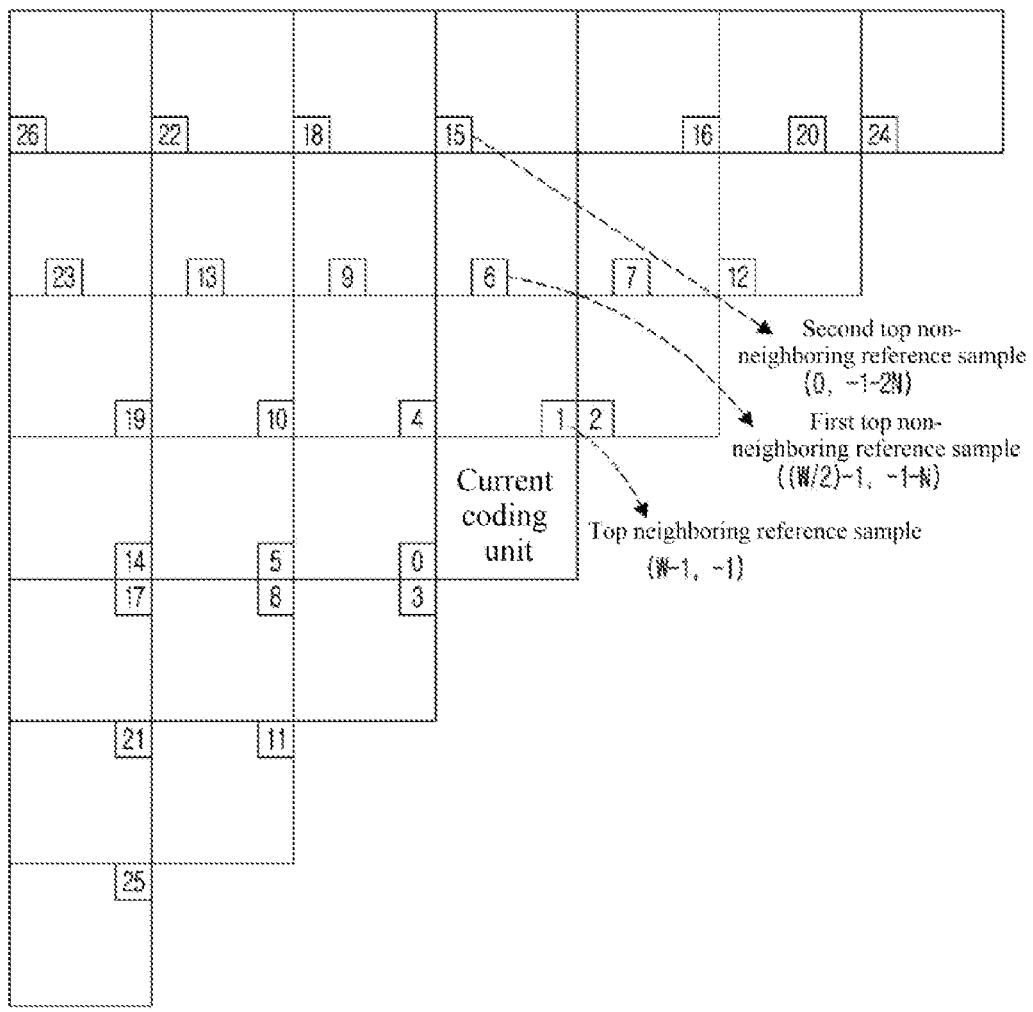
FIG. 13 is a view showing positions of reference samples.

FIG. 13 is a view showing positions of reference samples.

As shown in the example of FIG. 13, the x coordinates of the top non-neighboring reference samples may be set to be different from the x coordinates of the top neighboring reference samples. For example, when the position of the top neighboring reference sample is (W−1, −1), the position of a top non-neighboring reference sample separated as much as N from the top neighboring reference sample on the y-axis may be set to ((W/2)−1, −1−N), and the position of a top non-neighboring reference sample separated as much as 2N from the top neighboring reference sample on the y-axis may be set to (0, −1−2N). That is, the position of a non-adjacent reference sample may be determined based on the position of an adjacent reference sample and a distance from the adjacent reference sample.

Hereinafter, a candidate block including a neighboring reference sample among the candidate blocks is referred to as a neighboring block, and a block including a non-neighboring reference sample is referred to as a non-neighboring block.

When the distance between the current block and the candidate block is greater than or equal to a threshold value, the candidate block may be set to be unavailable as a merge candidate. The threshold value may be determined based on the size of the coding tree unit. For example, the threshold value may be set to the height (ctu_height) of the coding tree unit or a value obtained by adding or subtracting an offset to or from the height (e.g., ctu_height±N) of the coding tree unit. The offset N is a value predefined in the encoder and the decoder, and may be set to 4, 8, 16, 32 or ctu_height.

When the difference between the y-axis coordinate of the current block and the y-axis coordinate of a sample included in a candidate block is greater than the threshold value, the candidate block may be determined to be unavailable as a merge candidate.

Alternatively, a candidate block that does not belong to the same coding tree unit as the current block may be set to be unavailable as a merge candidate. For example, when a reference sample deviates from the top boundary of a coding tree unit to which the current block belongs, a candidate block including the reference sample may be set to be unavailable as a merge candidate.

When the top boundary of the current block is adjacent to the top boundary of the coding tree unit, a plurality of candidate blocks is determined to be unavailable as a merge candidate, and thus the encoding/decoding efficiency of the current block may decrease. To solve this problem, candidate blocks may be set so that the number of candidate blocks positioned on the left side of the current block is greater than the number of candidate blocks positioned on the top of the current block.

Figure 14:
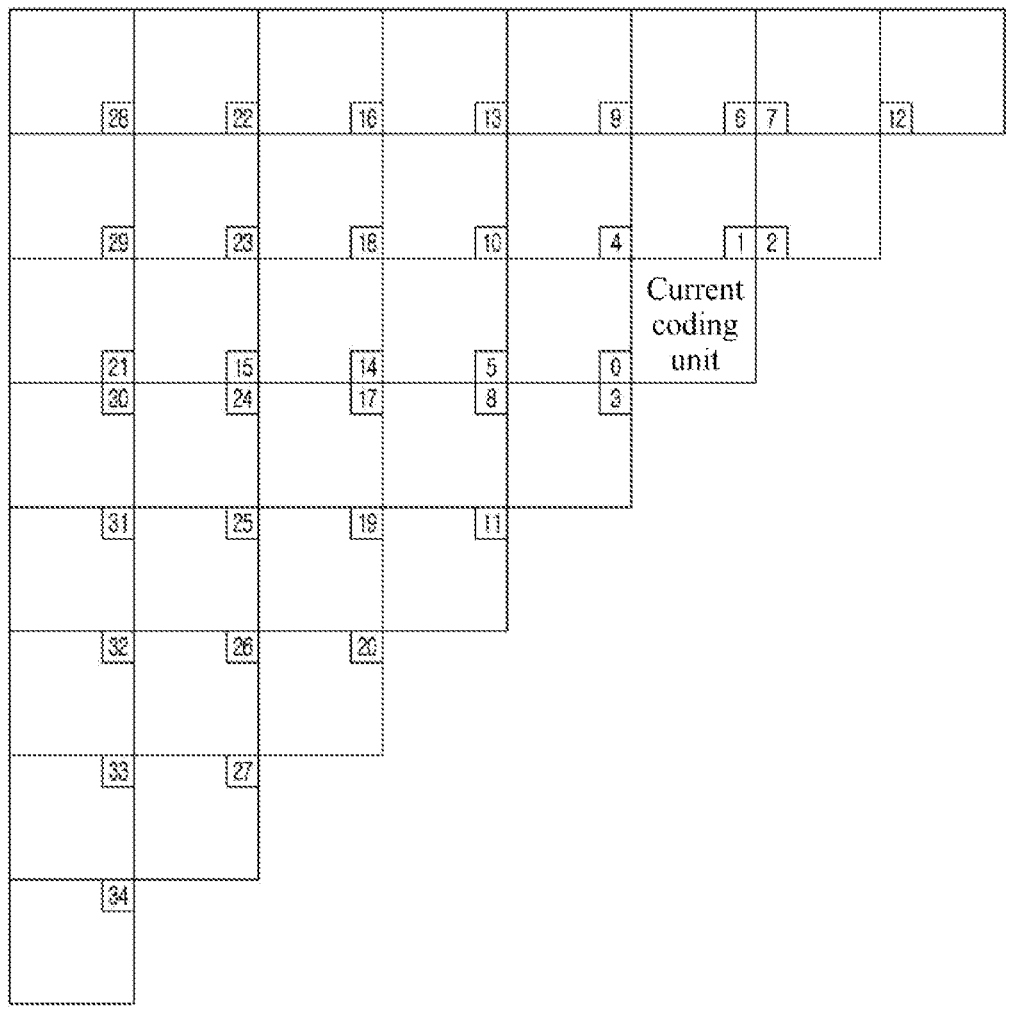
FIG. 14 is a view showing an example of candidate blocks used for deriving a merge candidate.

FIG. 14 is a view showing an example of candidate blocks used for deriving a merge candidate.

As shown in the example of FIG. 14, top blocks belonging to top N block columns of the current block and left-side blocks belonging to M left-side block columns of the current block may be set as candidate blocks. At this point, the number of left-side candidate blocks may be set to be greater than the number of top candidate blocks by setting M to be greater than N.

For example, the difference between the y-axis coordinate of the reference sample in the current block and the y-axis coordinate of the top block that can be used as a candidate block may be set not to exceed N times of the height of the current block. In addition, the difference between the x-axis coordinate of the reference sample in the current block and the x-axis coordinate of the left-side block that can be used as a candidate block may be set not to exceed M times of the width of the current block.

For example, in the example shown in FIG. 14, it is shown that blocks belonging to the top two block columns of the current block and blocks belonging to the left five block columns of the current block are set as candidate blocks.

As another example, when a candidate block does not belong to a coding tree unit the same as that of the current block, a merge candidate may be derived using a block belonging to the same coding tree unit as the current block or a block including a reference sample adjacent to the boundary of the coding tree unit, instead of the candidate block.

Figure 15:
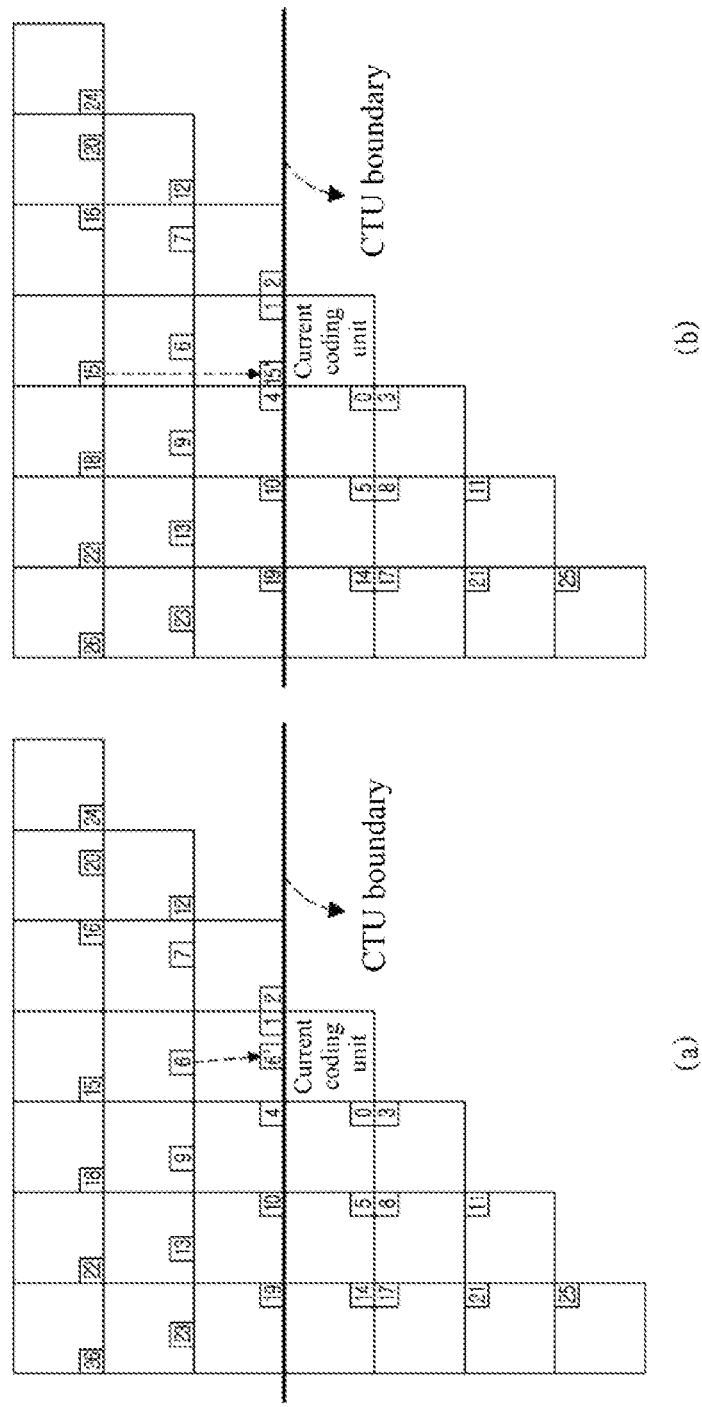
FIG. 15 is a view showing an example in which the position of a reference sample is changed.

FIG. 15 is a view showing an example in which the position of a reference sample is changed.

When a reference sample is included in a coding tree unit different from the current block, and the reference sample is not adjacent to the boundary of the coding tree unit, a candidate block may be determined using a reference sample adjacent to the boundary of the coding tree unit, instead of the reference sample.

For example, in the examples shown in FIGS. 15(a) and 15(b), when the top boundary of the current block and the top boundary of the coding tree unit are in contact with each other, the reference samples on the top of the current block belong to a coding tree unit different from the current block. Among the reference samples belonging to the coding tree unit different from the current block, a reference sample not adjacent to the top boundary of the coding tree unit may be replaced with a sample adjacent to the top boundary of the coding tree unit.

For example, as shown in the example of FIG. 15(a), the reference sample at position 6 is replaced with the sample at position 6' positioned at the top boundary of the coding tree unit, and as shown in the example of FIG. 15(b), the reference sample at position 15 is replaced with the sample at position 15' positioned at the top boundary of the coding tree unit. At this point, the y coordinate of the replacement sample is changed to a position adjacent to the coding tree unit, and the x coordinate of the replacement sample may be set to be equal to the reference sample. For example, the sample at position 6' may have the same x-coordinate as the sample at position 6, and the sample at position 15' may have the same x-coordinate as the sample at position 15.

Alternatively, a value obtained by adding or subtracting an offset to or from the x coordinate of the reference sample may be set as the x coordinate of the replacement sample. For example, when the x-coordinates of the neighboring reference sample positioned on the top of the current block and the non-neighboring reference sample are the same, a value obtained by adding or subtracting an offset to or from the x coordinate of the reference sample may be set as the x coordinate of the replacement sample. This is for preventing the replacement sample replacing the non-neighboring reference sample from being placed at the same position as another non-neighboring reference sample or neighboring reference sample.

Figure 16:
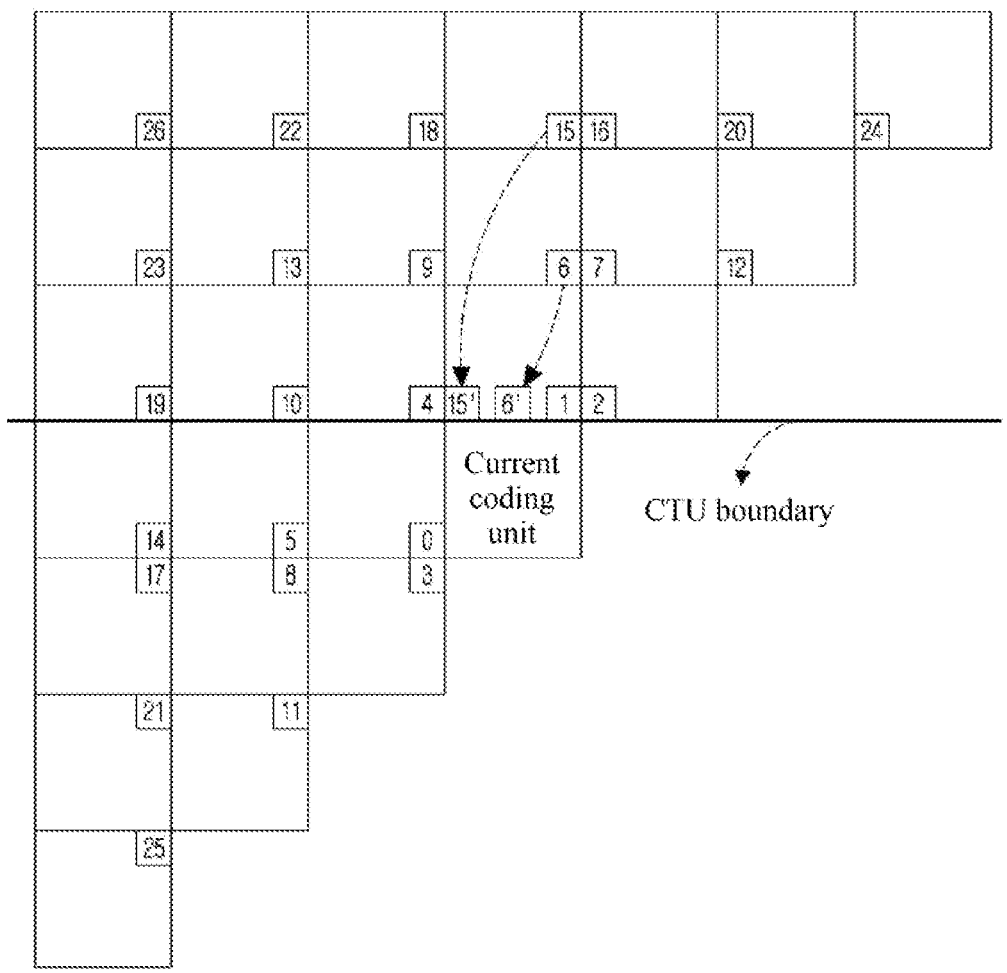
FIG. 16 is a view showing an example in which the position of a reference sample is changed.

FIG. 16 is a view showing an example in which the position of a reference sample is changed.

In replacing a reference sample that is included in a coding tree unit different from the current block and is not adjacent to the boundary of the coding tree unit with a sample positioned at the boundary of the coding tree unit, a value obtained by adding or subtracting an offset to and from the x coordinate of the reference sample may be set as the x-coordinate of the replacement sample.

For example, in the example shown in FIG. 16, the reference sample at position 6 and the reference sample at position 15 may be replaced with the sample at position 6' and the sample at position 15' respectively, of which the y coordinates are the same as that of the row adjacent to the top boundary of the coding tree unit. At this point, the x-coordinate of the sample at position 6' may be set to a value obtained by subtracting W/2 from the x-coordinate of the reference sample at position 6, and the x-coordinate of the sample at position 15' may be set to a value obtained by subtracting W−1 from the x-coordinate of the reference sample at position 15.

Unlike the examples shown in FIGS. 15 and 16, the y coordinate of the row positioned on the top of the uppermost row of the current block or the y coordinate of the top boundary of the coding tree unit may be set as the y coordinate of the replacement sample.

Although not shown, a sample replacing the reference sample may be determined based on the left-side boundary of the coding tree unit. For example, when the reference sample is not included in the same coding tree unit as the current block and is not adjacent to the left-side boundary of the coding tree unit, the reference sample may be replaced with a sample adjacent to the left-side boundary of the coding tree unit. At this point, the replacement sample may have a y-coordinate the same as that of the reference sample, or may have a y-coordinate obtained by adding or subtracting an offset to and from the y-coordinate of the reference sample.

Thereafter, a block including the replacement sample may be set as a candidate block, and a merge candidate of the current block may be derived based on the candidate block.

A merge candidate may also be derived from a temporally neighboring block included in a picture different from the current block. For example, a merge candidate may be derived from a collocated block included in a collocated picture.

The motion information of the merge candidate may be set to be equal to the motion information of the candidate block. For example, at least one among a motion vector, a reference picture index, a prediction direction, and a bidirectional weight index of the candidate block may be set as motion information of the merge candidate.

A merge candidate list including merge candidates may be generated (S1102). The merge candidates may be divided into an adjacent merge candidate derived from a neighboring block adjacent to the current block and a non-adjacent merge candidate derived from a non-neighboring block.

Indexes of the merge candidates in the merge candidate list may be assigned in a predetermined order. For example, an index assigned to an adjacent merge candidate may have a value smaller than an index assigned to a non-adjacent merge candidate. Alternatively, an index may be assigned to each of the merge candidates based on the index of each block shown in FIG. 12 or 14.

When a plurality of merge candidates is included in the merge candidate list, at least one among the plurality of merge candidates may be selected (S1103). At this point, information indicating whether motion information of the current block is derived from an adjacent merge candidate may be signaled through a bitstream. The information may be a 1-bit flag. For example, a syntax element isAdjancentMergeFlag indicating whether the motion information of the current block is derived from an adjacent merge candidate may be signaled through a bitstream. When the value of the syntax element isAdjancentMergeFlag is 1, motion information of the current block may be derived based on the adjacent merge candidate. On the other hand, when the value of the syntax element isAdjancentMergeFlag is 0, motion information of the current block may be derived based on a non-adjacent merge candidate.

Table 1 shows a syntax table including syntax element isAdjancentMergeFlag.

TABLE 1

| | Descriptor |
|---|---|
| coding_unit (x0, y0, cbWidth, cbHeight, treeType) { | |
|   if (slice_type ! = I) { | |
|     pred_mode_flag | ae(v) |
|   } | |
|   if (CuPredMode[x0][y0] = = MODE_INTRA) { | |
|     if (treeType = = SINGLE_TREE | | treeType = = DUAL_TREE_LUMA) { | |
|       intra_luma_mpm_flag[x0][y0] | |
|       if (intra_luma_mpm_flag[x0][y0]) | |
|         intra_luma_mpm_idx[x0][y0] | ae(v) |
|       else | |
|         intra_luma_mpm_remainder[x0][y0] | ae(v) |
|     } | |
|     if (treeType = = SINGLE_TREE | | treeType = = DUAL_TREE_CHROMA) | |
|       intra_chroma_pred_mode[x0][y0] | ae(v) |
|   } else { | |
|     if (cu_skip_falg[x0][y0]) { | |
|       if (MaxNumMergeCand > 1){ | |
|       isAdjacentMergeflag | ae(v) |
|       if (isAdjcanetMergeflag){ | |
|         merge_idx[x0][y0] | ae(v) |
|       } else{ | |
|         NA_merge_idx[x0][y0] | ae(v) |
|       } | |
|     } | |
|   } else {/* MODE_INTER*/ | |
|     merge_flag[x0][y0] | ae(v) |
|     if (merge_flag[x0][y0]){ | |

TABLE 1-continued

```
    if (MaxNumMergeCand > 1){
        isAdjacentMergeflag                                          ae(v)
        if (isAdjcanetMergeflag){
            merge_idx[x0][y0]                                        ae(v)
        } else{
            NA_merge_idx[x0][y0]                                     ae(v)
        }
    }
}
if (CuPredMode[x0][y0] ! = MODE_INTRA)
    cu_cbf                                                           ae(v)
if (cu_cbf) {
    transform_tree (x0, y0, cbWidth, cbHeight, treeType)
}
```

Information for specifying any one among a plurality of merge candidates may be signaled through a bitstream. For example, information indicating an index of any one among the merge candidates included in the merge candidate list may be signaled through a bitstream.

When isAdjacentMergeflag is 1, syntax element merge_idx specifying any one among the adjacent merge candidates may be signaled. The maximum value of syntax element merge_idx may be set to a value obtained by subtracting 1 from the number of adjacent merge candidates.

When isAdjacentMergeflag is 0, syntax element NA_merge_idx specifying any one among the non-adjacent merge candidates may be signaled. The syntax element NA_merge_idx represents a value obtained by subtracting the number of adjacent merge candidates from the index of the non-adjacent merge candidate. The decoder may select a non-adjacent merge candidate by adding the number of adjacent merge candidates to an index specified by NA_merge_idx.

When the number of merge candidates included in the merge candidate list is smaller than a threshold value, the merge candidate included in the prediction region motion information list may be added to the merge candidate list. Here, the threshold value may be the maximum number of merge candidates that can be included in the merge candidate list or a value obtained by subtracting an offset from the maximum number of merge candidates. The offset may be a natural number such as 1, 2, or the like. The inter region motion information list may include a merge candidate derived based on a block encoded/decoded before the current block.

The prediction region motion information list includes a merge candidate derived from a block encoded/decoded based on inter prediction in the current picture. For example, motion information of a merge candidate included in the prediction region motion information list may be set to be equal to motion information of a block encoded/decoded based on inter prediction. Here, the motion information may include at least one among a motion vector, a reference picture index, a prediction direction, and a bidirectional weight index.

For convenience of explanation, a merge candidate included in the prediction region motion information list will be referred to as a prediction region merge candidate.

The maximum number of merge candidates that can be included in the prediction region motion information list may be predefined by an encoder and a decoder. For example, the maximum number of merge candidates that can be included in the prediction region motion information list may be 1, 2, 3, 4, 5, 6, 7, 8 or more (e.g., 16).

Alternatively, information indicating the maximum number of merge candidates that can be included in the prediction region motion information list may be signaled through a bitstream. The information may be signaled at a sequence, picture, or slice level. The information may indicate the maximum number of merge candidates that can be included in the prediction region motion information list. Alternatively, the information may indicate a difference between the maximum number of merge candidates that can be included in the prediction region motion information list and the maximum number of merge candidates that can be included in the merge candidate list.

Alternatively, the maximum number of merge candidates of the prediction region motion information list may be determined according to the size of a picture, the size of a slice, or the size of a coding tree unit.

The prediction region motion information list may be initialized by the unit of picture, slice, tile, brick, coding tree unit, or coding tree unit line (row or column). For example, when a slice is initialized, the prediction region motion information list is also initialized, and the prediction region motion information list may not include any merge candidate.

Alternatively, information indicating whether to initialize the prediction region motion information list may be signaled through a bitstream. The information may be signaled at the slice, tile, brick, or block level. Until the information indicates to initialize the prediction region motion information list, a previously configured prediction region motion information list may be used.

Alternatively, information on the initial prediction region merge candidate may be signaled through a picture parameter set or a slice header. Although the slice is initialized, the prediction region motion information list may include the initial prediction region merge candidate. Accordingly, a prediction region merge candidate may be used for a block that is the first encoding/decoding target in the slice.

Alternatively, a prediction region merge candidate included in the prediction region motion information list of a previous coding tree unit may be set as the initial prediction region merge candidate. For example, among the prediction region merge candidates included in the prediction region motion information list of a previous coding tree unit, a prediction region merge candidate having the smallest index or a prediction region merge candidate having the largest index may be set as the initial prediction region merge candidate.

Blocks are encoded/decoded according to an encoding/decoding order, and blocks encoded/decoded based on inter prediction may be sequentially set as a prediction region merge candidate according to an encoding/decoding order.

Figure 17:
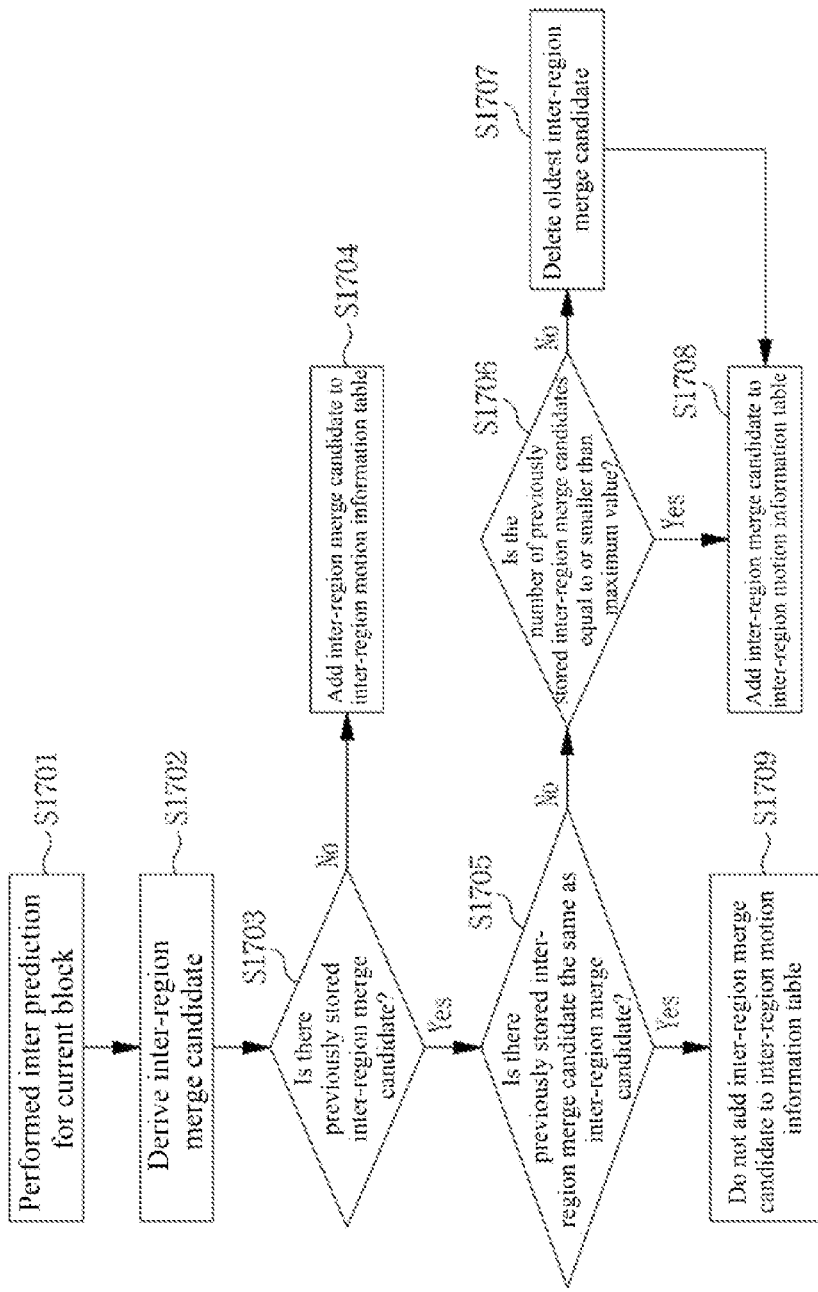
FIG. 17 is a flowchart showing a process of updating a prediction region motion information list.

FIG. 17 is a flowchart showing a process of updating a prediction region motion information list.

When inter prediction is performed on the current block (S1701), a prediction region merge candidate may be derived based on the current block (S1702). Motion information of the prediction region merge candidate may be set to be equal to the motion information of the current block.

When the prediction region motion information list is empty (S1703), the prediction region merge candidate derived based on the current block may be added to the prediction region motion information list (S1704).

When the prediction region motion information list already includes the prediction region merge candidate (S1703), a redundancy check may be performed on the motion information of the current block (or the prediction region merge candidate derived based on the current block) (S1705). The redundancy check is for determining whether motion information of a prediction region merge candidate previously stored in the prediction region motion information list and motion information of the current block are the same. The redundancy check may be performed on all prediction region merge candidates previously stored in the prediction region motion information list. Alternatively, the redundancy check may be performed on prediction region merge candidates having an index larger than a threshold value or smaller than a threshold value among the prediction region merge candidates previously stored in the prediction region motion information list.

When an inter prediction merge candidate having the same motion information as the motion information of the current block is not included, the prediction region merge candidate derived based on the current block may be added to the prediction region motion information list (S1708). Whether the inter prediction merge candidates are the same may be determined based on whether motion information (e.g., a motion vector and/or a reference picture index) of the inter prediction merge candidates is the same.

At this point, when the maximum number of prediction region merge candidates are already stored in the prediction region motion information list (S1706), the oldest prediction region merge candidate is deleted (S1707), and the prediction region merge candidate derived based on the current block may be added to the prediction region motion information list (S1708). Here, the oldest prediction region merge candidate may be a prediction region merge candidate having the largest index or a prediction region merge candidate having the smallest index.

Each of the prediction region merge candidates may be identified by an index. When a prediction region merge candidate derived from the current block is added to the prediction region motion information list, the lowest index (e.g., 0) is assigned to the prediction region merge candidate, and indexes of the previously stored prediction region merge candidates may be increased by 1. At this point, when the maximum number of inter prediction merge candidates are already stored in the prediction region motion information list, a prediction region merge candidate having the largest index is removed.

Alternatively, when the prediction region merge candidate derived from the current block is added to the prediction region motion information list, the largest index may be assigned to the prediction region merge candidate. For example, when the number of inter prediction merge candidates previously stored in the prediction region motion information list is smaller than a maximum value, an index having the same value as the number of previously stored inter prediction merge candidates may be assigned to the prediction region merge candidate. Alternatively, when the number of inter prediction merge candidates previously stored in the prediction region motion information list is the same as the maximum value, an index subtracting 1 from the maximum value may be assigned to the prediction region merge candidate. In addition, a prediction region merge candidate having the smallest index is removed, and indexes of remaining previously stored prediction region merge candidates may be decreased by 1.

Figure 18:
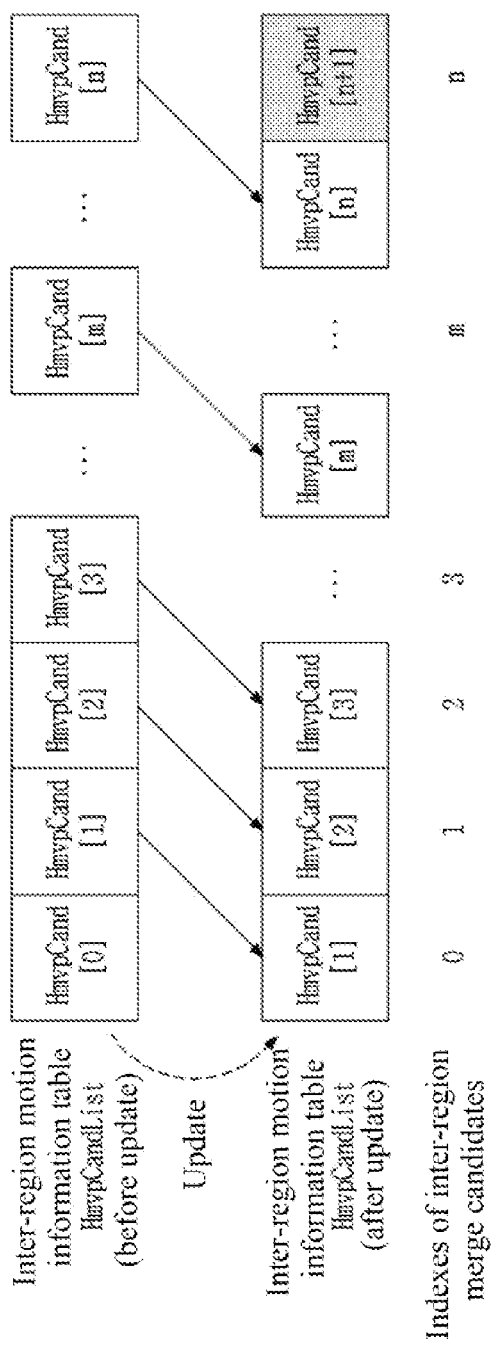
FIG. 18 is a view showing an embodiment of updating a prediction region merge candidate list.

FIG. 18 is a view showing an embodiment of updating a prediction region merge candidate list.

It is assumed that as the prediction region merge candidate derived from the current block is added to the prediction region merge candidate list, the largest index is assigned to the prediction region merge candidate. In addition, it is assumed that the maximum number of prediction region merge candidates is already stored in the prediction region merge candidate list.

When the prediction region merge candidate HmvpCand[n+1] derived from the current block is added to the prediction region merge candidate list HmvpCandList, the prediction region merge candidate HmvpCand[0] having the smallest index among the previously stored prediction region merge candidates are deleted, and the indexes of the remaining prediction region merge candidates may be decreased by 1. In addition, the index of the prediction region merge candidate HmvpCand[n+1] derived from the current block may be set to a maximum value (n in the example shown in FIG. 18).

When a prediction region merge candidate the same as the prediction region merge candidate derived based on the current block is previously stored (S1705), the prediction region merge candidate derived based on the current block may not be added to the prediction region motion information list (S1709).

Alternatively, as the prediction region merge candidate derived based on the current block is added to the prediction region motion information list, a previously stored prediction region merge candidate that is the same as the prediction region merge candidate may be removed. In this case, an effect the same as newly updating the index of the previously stored prediction region merge candidate is obtained.

Figure 19:
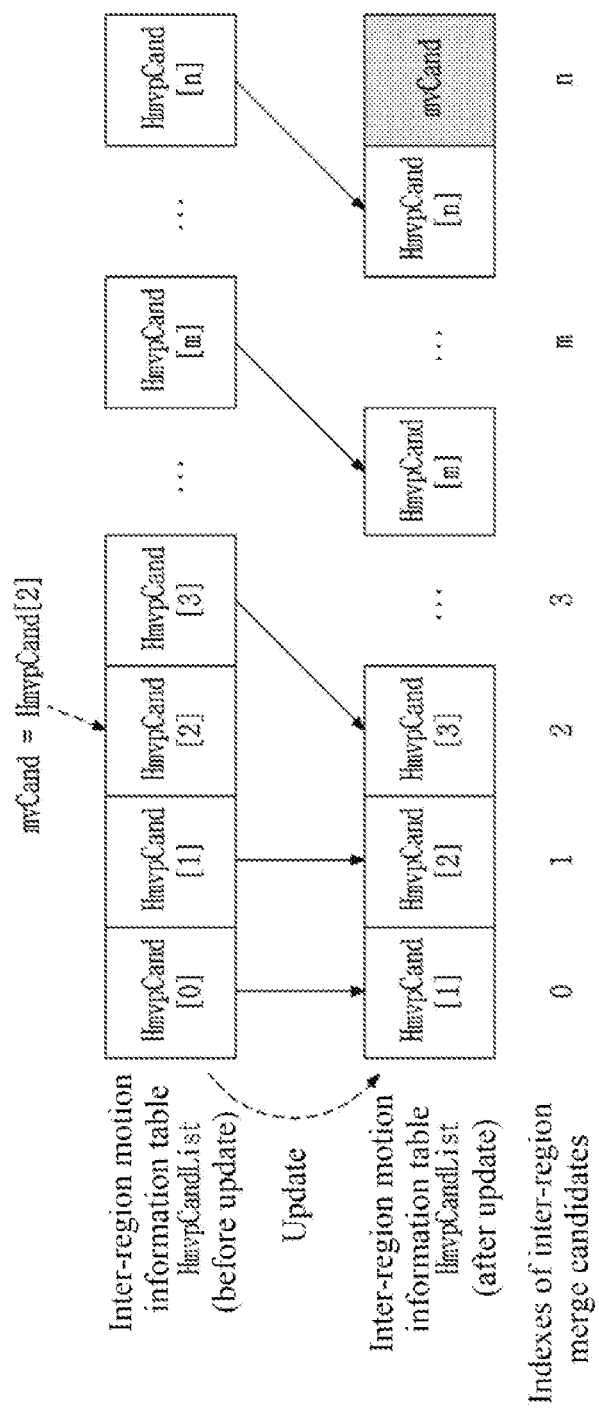
FIG. 19 is a view showing an example in which an index of a previously stored prediction region merge candidate is updated.

FIG. 19 is a view showing an example in which an index of a previously stored prediction region merge candidate is updated.

When the index of a previously stored inter prediction merge candidate mvCand that is the same as the prediction region merge candidate mvCand derived based on the current block is hIdx, the previously stored inter prediction merge candidate is deleted, and indexes of inter prediction merge candidates having an index larger than hIdx may be decreased by 1. For example, in the example shown in FIG. 19, it is shown that HmvpCand[2] the same as mvCand is deleted from the prediction region motion information list HvmpCandList, and the indexes of HmvpCand[3] to HmvpCand[n] are decreased by 1.

In addition, the prediction region merge candidate mvCand derived based on the current block may be added to the end of the prediction region motion information list.

Alternatively, the index assigned to the previously stored prediction region merge candidate that is the same as the prediction region merge candidate derived based on the current block may be updated. For example, the index of the previously stored prediction region merge candidate may be changed to a minimum value or a maximum value.

It may be set not to add motion information of blocks included in a predetermined region to the prediction region motion information list. For example, a prediction region merge candidate derived based on motion information of a block included in the merge processing area may not be added to the prediction region motion information list. Since an encoding/decoding order is not defined for the blocks included in the merge processing area, it is inappropriate to use motion information of any one among the blocks for inter prediction of another block. Accordingly, prediction region merge candidates derived based on the blocks included in the merge processing area may not be added to the prediction region motion information list.

Alternatively, it may be set not to add motion information of a block smaller than a preset size to the prediction region motion information list. For example, a prediction region merge candidate derived based on motion information of a coding block having a width or a height smaller than 4 or 8 or motion information of a coding block having a 4×4 size may not be added to the prediction region motion information list.

When motion compensation prediction is performed by the unit of subblock, a prediction region merge candidate may be derived based on motion information of a representative subblock among a plurality of subblocks included in the current block. For example, when a subblock merge candidate is used for the current block, a prediction region merge candidate may be derived based on motion information of a representative subblock among the subblocks.

Motion vectors of the subblocks may be derived in the following order. First, any one among the merge candidates included in the merge candidate list of the current block is selected, and an initial shift vector (shVector) may be derived based on the motion vector of the selected merge candidate. Then, a shift subblock, in which the position of the reference sample is (xColSb, yColSb), may be derived as the initial shift vector is added at the position (xSb, ySb) of the reference sample (e.g., the top-left sample or the sample at the center) of each subblock in the coding block. Equation 4 shows an equation for deriving a shift subblock.

$$(xColSb, yColSb) = (xSb + shVector[0] >> 4, ySb + shVector[1] >> 4)$$ [Equation 4]

Then, the motion vector of a collocated block corresponding to the center position of the subblock including (xColSb, yColSb) may be set as the motion vector of the subblock including (xSb, ySb).

The representative subblock may mean a subblock including the top-left sample or the sample at the center of the current block.

Figure 20:
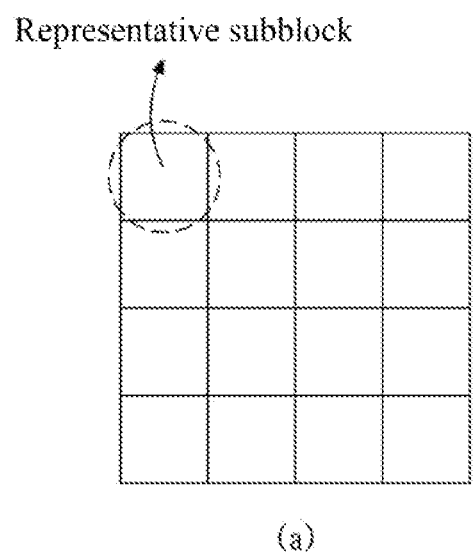
FIG. 20 is a view showing the position of a representative subblock.
Figure 20:
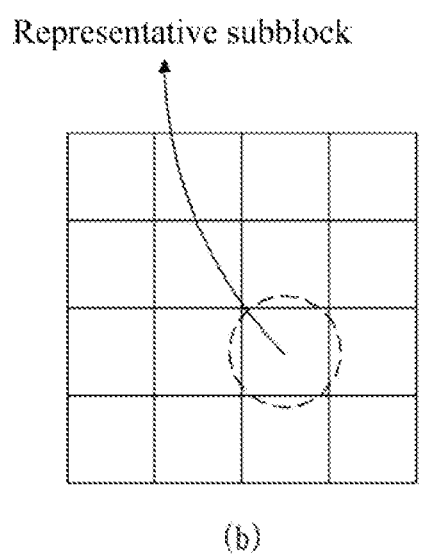

FIG. 20 is a view showing the position of a representative subblock.

FIG. 20(a) shows an example in which the subblock positioned at the top-left of the current block is set as the representative subblock, and FIG. 20(b) shows an example in which the subblock positioned at the center of the current block is set as the representative subblock. When motion compensation prediction is performed by unit of subblock, a prediction region merge candidate of the current block may be derived based on the motion vector of the subblock including the top-left sample of the current block or the subblock including the sample at the center of the current block.

It may be determined whether to use the current block as a prediction region merge candidate, based on the inter prediction mode of the current block. For example, a block encoded/decoded based on an affine motion model may be set to be unavailable as a prediction region merge candidate. Accordingly, although the current block is encoded/decoded by inter prediction, when the inter prediction mode of the current block is the affine prediction mode, the inter prediction motion information list may not be updated based on the current block.

Alternatively, the prediction region merge candidate may be derived based on at least one subblock vector among the subblocks included in the block encoded/decoded based on the affine motion model. For example, the prediction region merge candidate may be derived using a subblock positioned at the top-left, a subblock positioned at the center, or a subblock positioned at the top-right side of the current block. Alternatively, an average value of subblock vectors of a plurality of subblocks may be set as the motion vector of the prediction region merge candidate.

Alternatively, the prediction region merge candidate may be derived based on an average value of affine seed vectors of the block encoded/decoded based on the affine motion model. For example, an average of at least one among the first affine seed vector, the second affine seed vector, and the third affine seed vector of the current block may be set as the motion vector of the prediction region merge candidate.

Alternatively, a prediction region motion information list may be configured for each inter prediction mode. For example, at least one among a prediction region motion information list for a block encoded/decoded by intra-block copy, a prediction region motion information list for a block encoded/decoded based on a translational motion model, and a prediction region motion information list for a block encoded/decoded based on an affine motion model may be defined. According to the inter prediction mode of the current block, any one among a plurality of prediction region motion information lists may be selected.

Figure 21:
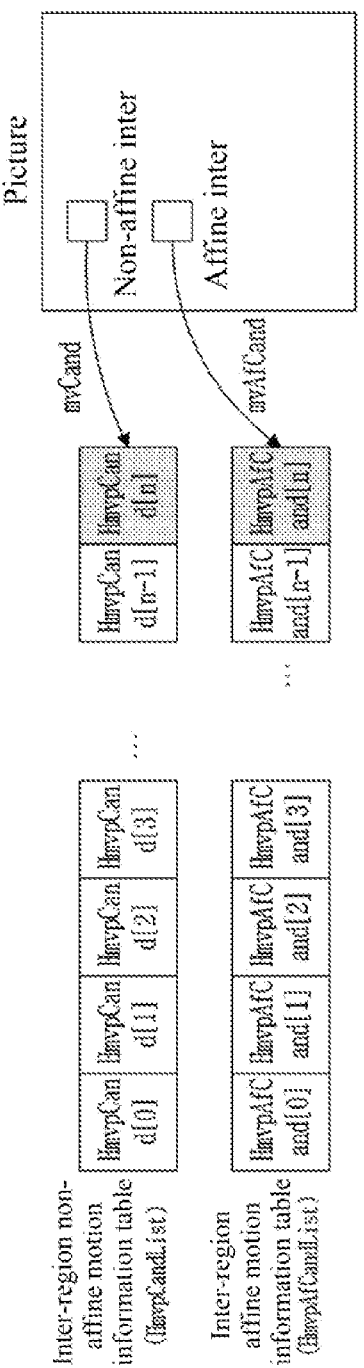
FIG. 21 is a view showing an example in which a prediction region motion information list is generated for each inter prediction mode.

FIG. 21 is a view showing an example in which a prediction region motion information list is generated for each inter prediction mode.

When a block is encoded/decoded based on a non-affine motion model, a prediction region merge candidate mvCand derived based on the block may be added to a prediction region non-affine motion information list HmvpCandList. On the other hand, when a block is encoded/decoded based on an affine motion model, a prediction region merge candidate mvAfC and derived based on the block may be added to a prediction region affine motion information list HmvpAfCandList.

Affine seed vectors of a block encoded/decoded based on the affine motion model may be stored in a prediction region merge candidate derived from the block. Accordingly, the prediction region merge candidate may be used as a merge candidate for deriving the affine seed vector of the current block.

In addition to the prediction region motion information list described above, an additional prediction region motion information list may be defined. In addition to the prediction region motion information list described above (hereinafter, referred to as a first prediction region motion information list), a long-term motion information list (hereinafter, referred to as a second prediction region motion information list) may be defined. Here, the long-term motion information list includes long-term merge candidates.

When both the first prediction region motion information list and the second prediction region motion information list are empty, first, prediction region merge candidates may be added to the second prediction region motion information list. Only after the number of available prediction region merge candidates reaches the maximum number in the second prediction region motion information list, prediction region merge candidates may be added to the first prediction region motion information list.

Alternatively, one inter prediction merge candidate may be added to both the second prediction region motion information list and the first prediction region motion information list.

At this point, the second prediction region motion information list, the configuration of which has been completed, may not be updated any more. Alternatively, when the decoded region is greater than or equal to a predetermined ratio of the slice, the second prediction region motion information list may be updated. Alternatively, the second prediction region motion information list may be updated for every N coding tree unit lines.

On the other hand, the first prediction region motion information list may be updated whenever a block encoded/decoded by inter prediction is generated. However, it may be set not to use the prediction region merge candidate added to the second prediction region motion information list, to update the first prediction region motion information list.

Information for selecting any one among the first prediction region motion information list and the second prediction region motion information list may be signaled through a bitstream. When the number of merge candidates included in the merge candidate list is smaller than a threshold value, merge candidates included in the prediction region motion information list indicated by the information may be added to the merge candidate list.

Alternatively, a prediction region motion information list may be selected based on the size and shape of the current block, inter prediction mode, whether bidirectional prediction is enabled, whether motion vector refinement is enabled, or whether triangular partitioning is enabled.

Alternatively, although a prediction region merge candidate included in the first prediction region motion information list is added, when the number of merge candidates included in the merge candidate list is smaller than the maximum number of merges, the prediction region merge candidates included in the second prediction region motion information list may be added to the merge candidate list.

Figure 22:
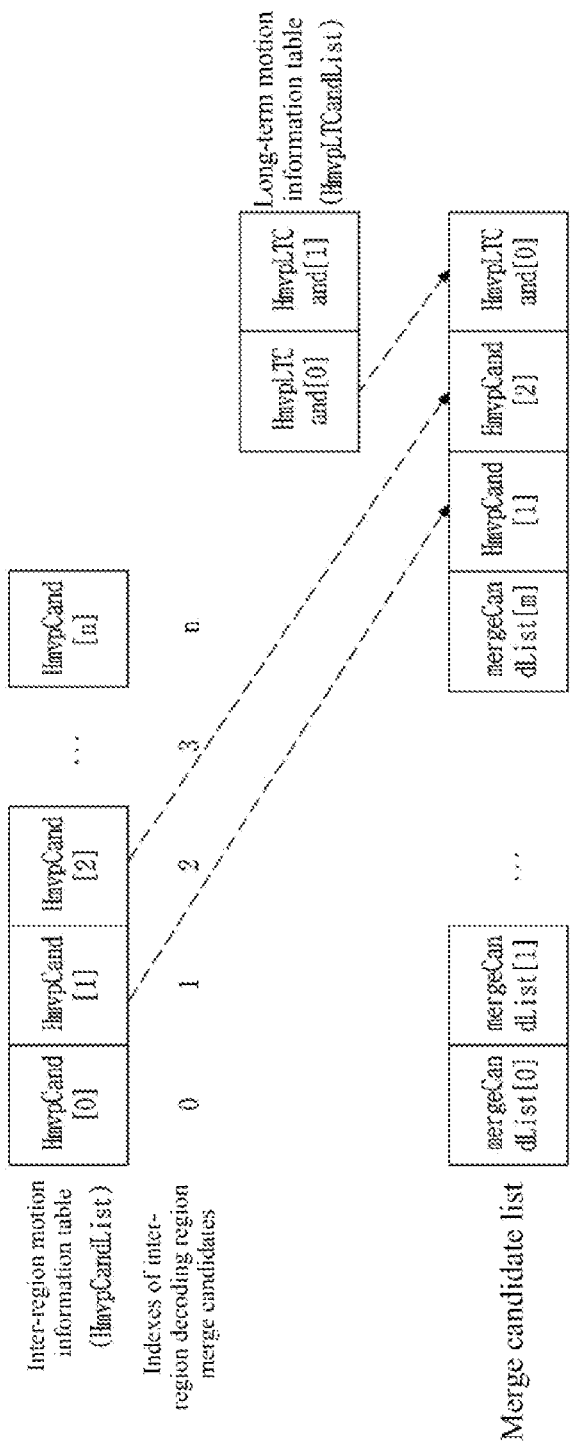
FIG. 22 is a view showing an example in which a prediction region merge candidate included in a long-term motion information list is added to a merge candidate list.

FIG. 22 is a view showing an example in which a prediction region merge candidate included in a long-term motion information list is added to a merge candidate list.

When the number of merge candidates included in the merge candidate list is smaller than the maximum number, the prediction region merge candidates included in the first prediction region motion information list HmvpCandList may be added to the merge candidate list. When the number of merge candidates included in the merge candidate list is smaller than the maximum number although the prediction region merge candidates included in the first prediction region motion information list are added to the merge candidate list, the prediction region merge candidates included in the long-term motion information list HmvpLTCandList may be added to the merge candidate list.

Table 2 shows a process of adding the prediction region merge candidates included in the long-term motion information list to the merge candidate list.

TABLE 2

| For each candidate in HMVPCandList with index HMVPLTIdx = 1.. numHMVPLTCand, the following ordered steps are repeated until combStop is equal to true |
|---|
| sameMotion is set to FALSE |
| If hmvpStop is equal to FALSE and numCurrMergecand is less than (MaxNumMergeCand-1), hmvpLT is set to TRUE |
| If HMVPLTCandList[NumLTHmvp-HMVPLTIdx] have the same motion vectors and the same reference indices with any mergeCandList[i] with I being 0.. numOrigMergeCand-1 and HasBeenPruned[i] equal to false, sameMotion is set to true |
| If sameMotion is equal to false, mergeCandList[numCurrMergeCand++] is set to HMVPLTCandList[NumLTHmvp-HMVPLTIdx] |
| If numCurrMergeCand is equal to (MaxNumMergeCand-1), hmvpLTStop is set to TRUE |

The prediction region merge candidate may be set to include additional information, in addition to motion information. For example, for the prediction region merge candidate, a size, a shape, or partition information of a block may be additionally stored. When the merge candidate list of the current block is constructed, only inter prediction merge candidates having a size, a shape, or partition information the same as or similar to those of the current block are used among the inter prediction merge candidates, or inter prediction merge candidates having a size, a shape, or partition information the same as or similar to those of the current block may be added to the merge candidate list in the first place.

Alternatively, a prediction region motion information list may be generated for each of the size, shape, or partition information of a block. Among the plurality of prediction region motion information lists, a merge candidate list of the current block may be generated by using a prediction region motion information list corresponding to the shape, size, or partition information of the current block.

When the number of merge candidates included in the merge candidate list of the current block is smaller than the threshold value, the prediction region merge candidates included in the prediction region motion information list may be added to the merge candidate list. The addition process is performed in an ascending or descending order based on the index. For example, a prediction region merge candidate having the largest index may be first added to the merge candidate list.

When it is desired to add a prediction region merge candidate included in the prediction region motion information list to the merge candidate list, a redundancy check may be performed between the prediction region merge candidate and the merge candidates previously stored in the merge candidate list.

For example, Table 3 shows a process in which a prediction region merge candidate is added to the merge candidate list.

TABLE 3

For each candidate in HMVPCandList with index HMVPIdx = 1.. numCheckedHMVPCand,
the following ordered steps are repeated until combStop is equal to true
sameMotion is set to false
If HMVPCandList[NumHmvp-HMVPIdx] have the same motion vectors and the same
reference indices with any mergeCandList[i] with I being 0.. numOrigMergeCand-1 and
HasBeenPruned[i] equal to false, sameMotion is set to true
If sameMotion is equal to false, mergeCandList[numCurrMergeCand++] is set to
HMVPCandList[NumHmvp-HMVPIdx]
If numCurrMergeCand is equal to (MaxNumMergeCand-1), hmvpStop is set to TRUE The redundancy check may be performed only on some of the prediction region merge candidates included in the prediction region motion information list. For example, the redundancy check may be performed only on prediction region merge candidates having an index larger than a threshold value or smaller than a threshold value. Alternatively, the redundancy check may be performed only on N merge candidates having the largest index or N merge candidates having the smallest index.

Alternatively, the redundancy check may be performed only on some of the merge candidates previously stored in the merge candidate list. For example, the redundancy check may be performed only on a merge candidate having an index larger than a threshold value or smaller than a threshold value, or on a merge candidate derived from a block at a specific position. Here, the specific position may include at least one among a left neighboring block, a top neighboring block, a top-right neighboring block, and a bottom-left neighboring block of the current block.

Figure 23:
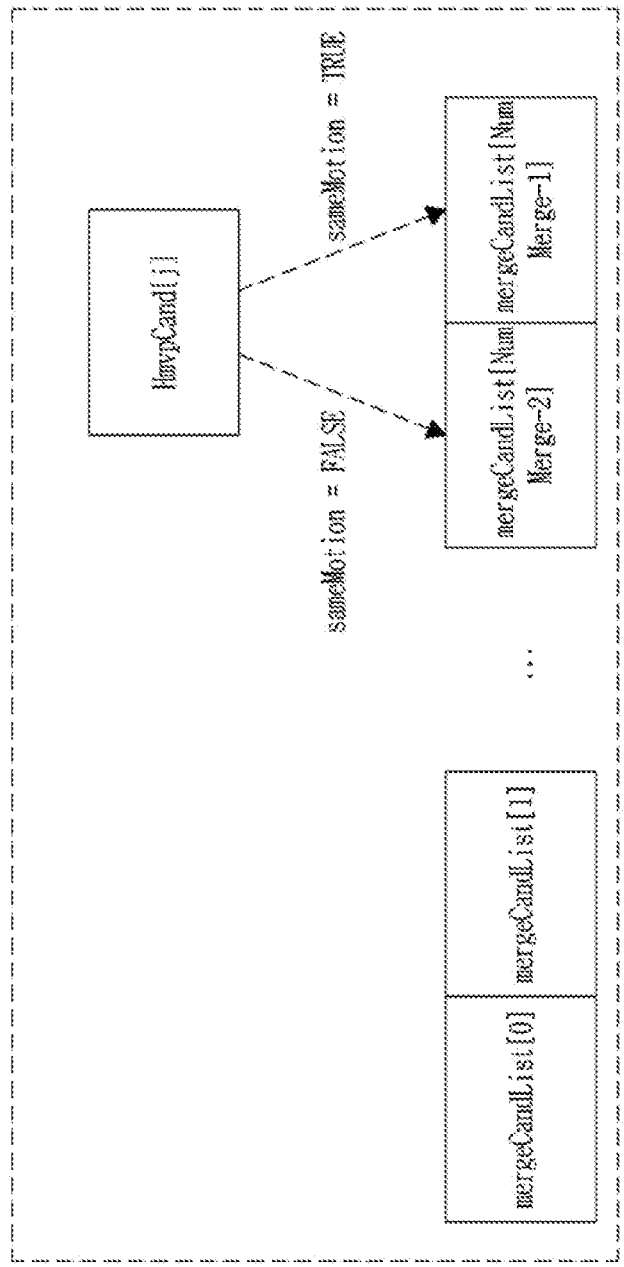
FIG. 23 is a view showing an example in which a redundancy check is performed only on some of merge candidates.

FIG. 23 is a view showing an example in which a redundancy check is performed only on some of merge candidates.

When it is desired to add the prediction region merge candidate HmvpCand[j] to the merge candidate list, a redundancy check may be performed on the prediction region merge candidate with two merge candidates mergeCandList[NumMerge-2] and mergeCandList[NumMerge-1] having the largest indexes. Here, NumMerge may represent the number of spatial merge candidates and temporal merge candidates that are available.

Unlike the example shown in the drawing, when it is desired to add a prediction region merge candidate HmvpCand[j] to the merge candidate list, a redundancy check may be performed on the prediction region merge candidate with up to two merge candidates having the smallest index. For example, it is possible to check whether mergeCandList[0] and mergeCandList[1] are the same as HmvpCand[j].

Alternatively, a redundancy check may be performed only on merge candidates derived at a specific position. For example, the redundancy check may be performed on at least one among a merge candidate derived from a neighboring block positioned on the left side of the current block and a merge candidate derived from a neighboring block positioned on the top the current block. When a merge candidate derived at a specific position does not exist in the merge candidate list, a prediction region merge candidate may be added to the merge candidate list without having a redundancy check.

When it is desired to add the prediction region merge candidate HmvpCand[j] to the merge candidate list, a redundancy check may be performed on the prediction region merge candidate with two merge candidates mergeCandList[NumMerge-2] and mergeCandList[NumMerge-1] having the largest indexes. Here, NumMerge may represent the number of spatial merge candidates and temporal merge candidates that are available.

The redundancy check with the merge candidate may be performed only on some of the prediction region merge candidates. For example, the redundancy check may be performed only on N prediction region merge candidates having a large index or N prediction region merge candidates having a small index among the prediction region merge candidates included in the prediction region motion information list. For example, the redundancy check may be performed only on prediction region merge candidates of which a difference between the number of prediction region merge candidates included in the prediction region motion information list and an index is smaller than or equal to a threshold value. When the threshold value is 2, the redundancy check may be performed only on three prediction region merge candidates having the largest index value among the prediction region merge candidates included in the prediction region motion information list. The redundancy check may be omitted for prediction region merge candidates excluding the three prediction region merge candidates. When the redundancy check is omitted, a prediction region merge candidate may be added to the merge candidate list regardless of whether the prediction region merge candidate has motion information the same as that of the merge candidate.

Contrarily, it may be set to perform the redundancy check only on prediction region merge candidates of which a difference between the number of prediction region merge candidates included in the prediction region motion information list and an index is equal to or greater than a threshold value.

The number of prediction region merge candidates on which the redundancy check is performed may be predefined in the encoder and the decoder. For example, the threshold value may be an integer such as 0, 1 or 2.

Alternatively, the threshold value may be determined based on at least one among the number of merge candidates included in the merge candidate list and the number of prediction region merge candidates included in the prediction region motion information list.

When a merge candidate the same as the first prediction region merge candidate is found and a redundancy check is performed on the second prediction region merge candidate, the redundancy check with a merge candidate the same as the first prediction region merge candidate may be omitted.

Figure 24:
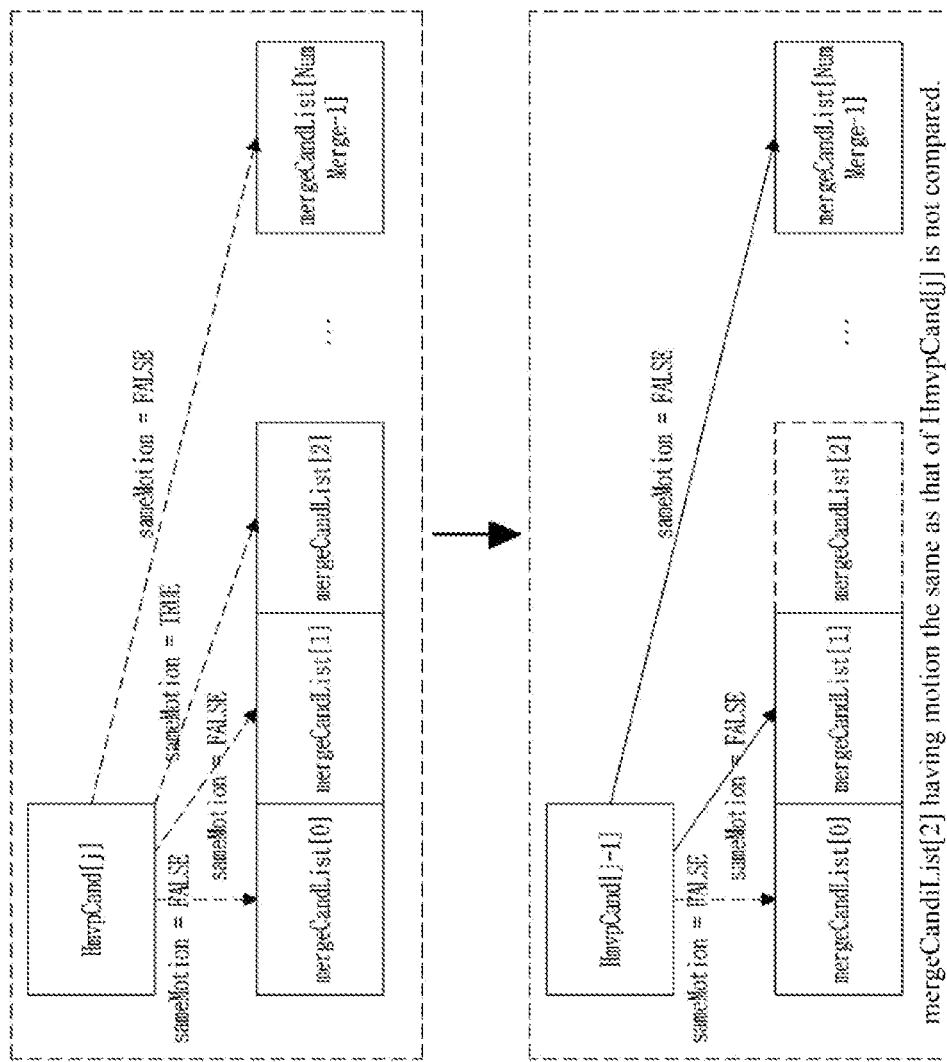
FIG. 24 is a view showing an example in which a redundancy check is omitted for a specific merge candidate.

FIG. 24 is a view showing an example in which a redundancy check is omitted for a specific merge candidate.

When it is desired to add a prediction region merge candidate HmvpCand[i] having index i to the merge candidate list, a redundancy check is performed between the prediction region merge candidate and merge candidates previously stored in the merge candidate list. At this point, when a merge candidate mergeCandList[j] the same as the prediction region merge candidate HmvpCand[i] is found, the redundancy check may be performed between the prediction region merge candidate HmvpCand[i−1] having index i−1 and the merge candidates without adding the prediction region merge candidate HmvpCand[i] to the merge candidate list. At this point, the redundancy check between the prediction region merge candidate HmvpCand[i−1] and the merge candidate mergeCandList[j] may be omitted.

For example, in the example shown in FIG. 24, it is determined that HmvpCand[i] and mergeCandList[2] are the same. Accordingly, HmvpCand[i] is not added to the merge candidate list, and a redundancy check may be performed on HmvpCand[i−1]. At this point, the redundancy check between HvmpCand[i−1] and mergeCandList[2] may be omitted.

When the number of merge candidates included in the merge candidate list of the current block is smaller than the threshold value, at least one among a pairwise merge candidate and a zero-merge candidate may be further included, in addition to the prediction region merge candidate. The pairwise merge candidate means a merge candidate having an average value of motion vectors of two or more merge candidates as a motion vector, and the zero-merge candidate means a merge candidate having a motion vector of 0.

A merge candidate may be added to the merge candidate list of the current block in the following order.

Spatial merge candidate—Temporal merge candidate—Prediction region merge candidate—(Prediction region affine merge candidate)—Pairwise merge candidate—Zero merge candidate The spatial merge candidate means a merge candidate derived from at least one among a neighboring block and a non-neighboring block, and the temporal merge candidate means a merge candidate derived from a previous reference picture. The prediction region affine merge candidate represents a prediction region merge candidate derived from a block encoded/decoded with an affine motion model.

The prediction region motion information list may also be used in the motion vector prediction mode. For example, when the number of motion vector prediction candidates included in a motion vector prediction candidate list of the current block is smaller than a threshold value, a prediction region merge candidate included in the prediction region motion information list may be set as a motion vector prediction candidate for the current block. Specifically, the motion vector of the prediction region merge candidate may be set as a motion vector prediction candidate.

When any one among the motion vector prediction candidates included in the motion vector prediction candidate list of the current block is selected, the selected candidate may be set as the motion vector predictor of the current block. Thereafter, after a motion vector residual coefficient of the current block is decoded, a motion vector of the current block may be obtained by adding the motion vector predictor and the motion vector residual coefficient.

The motion vector prediction candidate list of the current block may be configured in the following order.

Spatial motion vector prediction candidate—Temporal motion vector prediction candidate—Inter prediction region merge candidate—(Inter prediction region affine merge candidate)—Zero-motion vector prediction candidate The spatial motion vector prediction candidate means a motion vector prediction candidate derived from at least one among a neighboring block and a non-neighboring block, and the temporal motion vector prediction candidate means a motion vector prediction candidate derived from a previous reference picture. The prediction region affine merge candidate represents a prediction region motion vector prediction candidate derived from a block encoded/decoded with the affine motion model. The zero-motion vector prediction candidate represents a candidate having a motion vector value of 0.

A merge processing area having a size greater than that of a coding block may be defined. Coding blocks included in the merge processing area are not sequentially encoded/decoded, and may be processed in parallel. Here, that coding blocks are not sequentially encoded/decoded means that an encoding/decoding order is not defined. Accordingly, a process of encoding/decoding the blocks included in the merge processing area may be independently processed. Alternatively, the blocks included in the merge processing area may share merge candidates. Here, the merge candidates may be derived based on the merge processing area.

According to the characteristics described above, the merge processing area may also be referred to as a parallel processing region, a shared merge region (SMR), or a merge estimation region (MER).

The merge candidate of the current block may be derived based on the coding block. However, when the current block is included in a merge processing area of a size greater than the current block, a candidate block included in the merge processing area the same as the current block may be set to be unavailable as a merge candidate.

Figure 25:
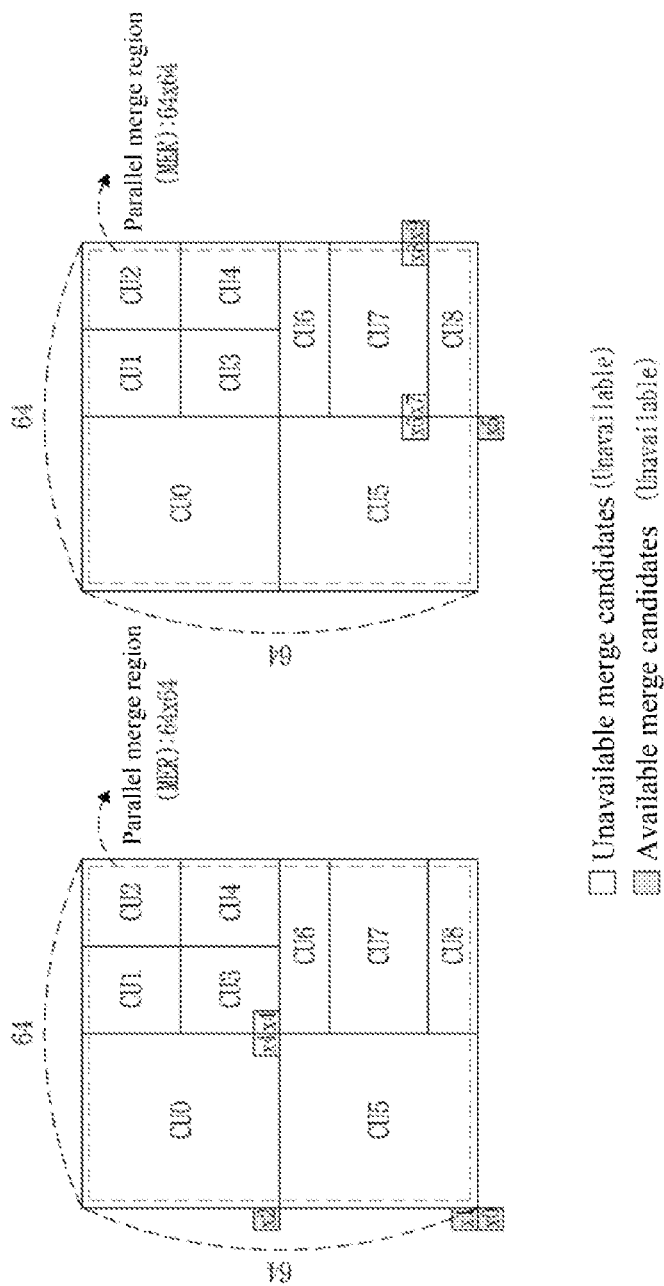
FIG. 25 is a view showing an example in which candidate blocks included in the same merge processing area as the current block are set to be unavailable as a merge candidate.

FIG. 25 is a view showing an example in which candidate blocks included in the same merge processing area as the current block are set to be unavailable as a merge candidate.

In the example shown in FIG. 25(a), when CU5 is encoded/decoded, blocks including reference samples adjacent to CU5 may be set as candidate blocks. At this point, candidate blocks X3 and X4 included in the merge processing area the same as CU5 may be set to be unavailable as a merge candidate of CU5. On the other hand, candidate blocks X0, X1 and X2 that are not included in the merge processing area the same as CU5 may be set to be available as a merge candidate.

In the example shown in FIG. 25(b), when CU8 is encoded/decoded, blocks including reference samples adjacent to CU8 may be set as candidate blocks. At this point, candidate blocks X6, X7 and X8 included in the merge processing area the same as CU8 may be set to be unavailable as a merge candidate. On the other hand, candidate blocks X5 and X9 that are not included in the merge processing area the same as CU8 may be set to be available as a merge candidate.

The merge processing area may be a square or non-square shape. Information for determining the merge processing area may be signaled through a bitstream. The information may include at least one among information indicating the shape of the merge processing area and information indicating the size of the merge processing area. When the merge processing area is a non-square shape, at least one among information indicating the size of the merge processing area, information indicating the width and/or height of the merge processing area, and information indicating a ratio of width to height of the merge processing area may be signaled through a bitstream.

The size of the merge processing area may be determined based on at least one among information signaled through a bitstream, a picture resolution, a slice size, and a tile size.

When motion compensation prediction is performed on a block included in the merge processing area, a prediction region merge candidate derived based on motion information of the block on which motion compensation prediction has been performed may be added to the prediction region motion information list.

However, in the case where a prediction region merge candidate derived from a block included in the merge processing area is added to the prediction region motion information list, when another block in the merge processing area, which actually is encoded/decoded after the block is encoded/decoded, is encoded/decoded, there may be a case of using a prediction region merge candidate derived from the block. That is, although dependency among blocks should be excluded when the blocks included in the merge processing area are encoded/decoded, there may be a case a case of performing motion prediction compensation using motion information of another block included in the merge processing area. In order to solve the problem, although encoding/decoding of a block included in the merge processing area is completed, motion information of the encoded/decoded block may not be added to the prediction region motion information list.

Alternatively, when motion compensation prediction is performed on the blocks included in the merge processing area, prediction region merge candidates derived from the blocks may be added to the prediction region motion information list in a predefined order. Here, the predefined order may be determined according to the scan order of the coding blocks in the merge processing area or the coding tree unit. The scan order may be at least one among the raster scan, horizontal scan, vertical scan, and zigzag scan. Alternatively, the predefined order may be determined based on motion information of each block or the number of blocks having the same motion information.

Alternatively, a prediction region merge candidate including unidirectional motion information may be added to the prediction region merge list before a prediction region merge candidate including bidirectional motion information. Contrarily, a prediction region merge candidate including bidirectional motion information may be added to the prediction region merge candidate list before a prediction region merge candidate including unidirectional motion information.

Alternatively, a prediction region merge candidate may be added to the prediction region motion information list according to an order of a high use frequency or a low use frequency within the merge processing area or the coding tree unit.

When the current block is included in the merge processing area and the number of merge candidates included in the merge candidate list of the current block is smaller than the maximum number, prediction region merge candidates included in the prediction region motion information list may be added to the merge candidate list. At this point, it may be set not to add a prediction region merge candidate derived from a block included in a merge processing area the same as the current block to the merge candidate list of the current block.

Alternatively, when the current block is included in the merge processing area, it may be set not to use the prediction region merge candidates included in the prediction region motion information list. That is, although the number of merge candidates included in the merge candidate list of the current block is smaller than the maximum number, the prediction region merge candidates included in the prediction region motion information list may not be added to the merge candidate list.

A prediction region motion information list for a merge processing area or a coding tree unit may be configured. This prediction region motion information list performs a function of temporarily storing motion information of blocks included in the merge processing area. In order to distinguish a general prediction region motion information list from the prediction region motion information list for a merge processing area or a coding tree unit, the prediction region motion information list for a merge processing area or a coding tree unit is referred to as a temporary motion information list. In addition, a prediction region merge candidate stored in the temporary motion information list will be referred to as a temporary merge candidate.

Figure 26:
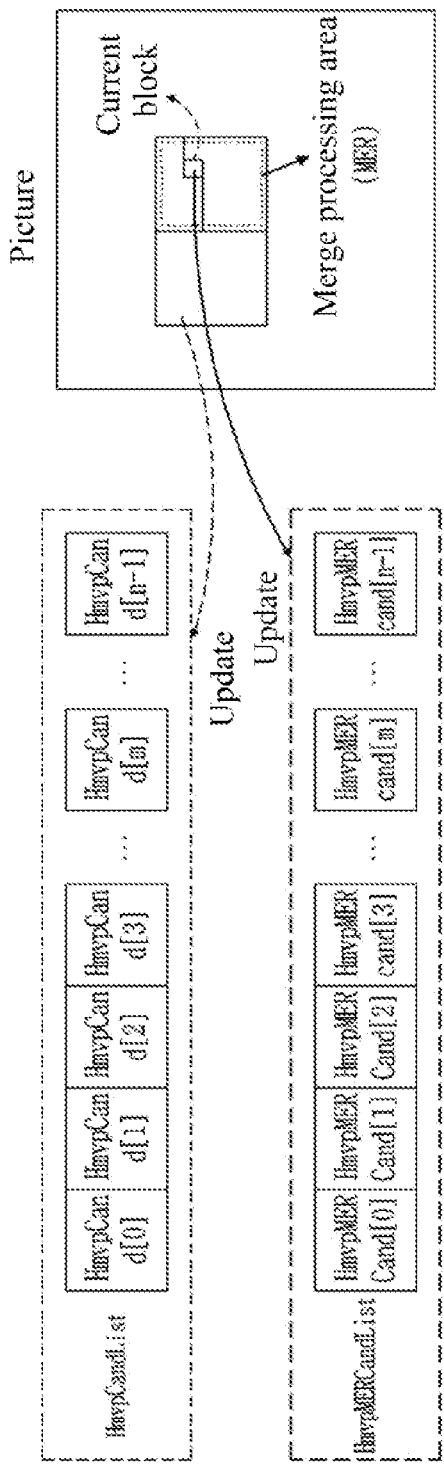
FIG. 26 is a view showing a temporary motion information list.

FIG. 26 is a view showing a temporary motion information list.

A temporary motion information list for a coding tree unit or a merge processing area may be configured. When motion compensation prediction has been performed on the current block included in the coding tree unit or the merge processing area, motion information of the block may not be added to the inter prediction motion information list HmvpCandList. Instead, a temporary merge candidate derived from the block may be added to the temporary motion information list HmvpMERCandList. That is, the temporary merge candidate added to the temporary motion information list may not be added to the prediction region motion information list. Accordingly, the prediction region motion information list may not include prediction region merge candidates derived based on motion information of the blocks included in the coding tree unit or the merge processing area.

The maximum number of merge candidates that the temporary motion information list may include may be set to be the same as that of the prediction region motion information list. Alternatively, the maximum number of merge candidates that the temporary motion information list may include may be determined according to the size of the coding tree unit or the merge processing area.

The current block included in the coding tree unit or the merge processing area may be set not to use the temporary motion information list for a corresponding coding tree unit or a corresponding merge processing area. That is, when the number of merge candidates included in the merge candidate list of the current block is smaller than a threshold value, the prediction region merge candidates included in the prediction region motion information list are added to the merge candidate list, and the temporary merge candidates included in the temporary motion information list may not be added to the merge candidate list. Accordingly, motion information of other blocks included in the coding tree unit or the merge processing area the same as the current block may not be used for motion compensation prediction of the current block.

When encoding/decoding of all the blocks included in the coding tree unit or the merge processing area is completed, the prediction region motion information list and the temporary motion information list may be merged.

Figure 27:
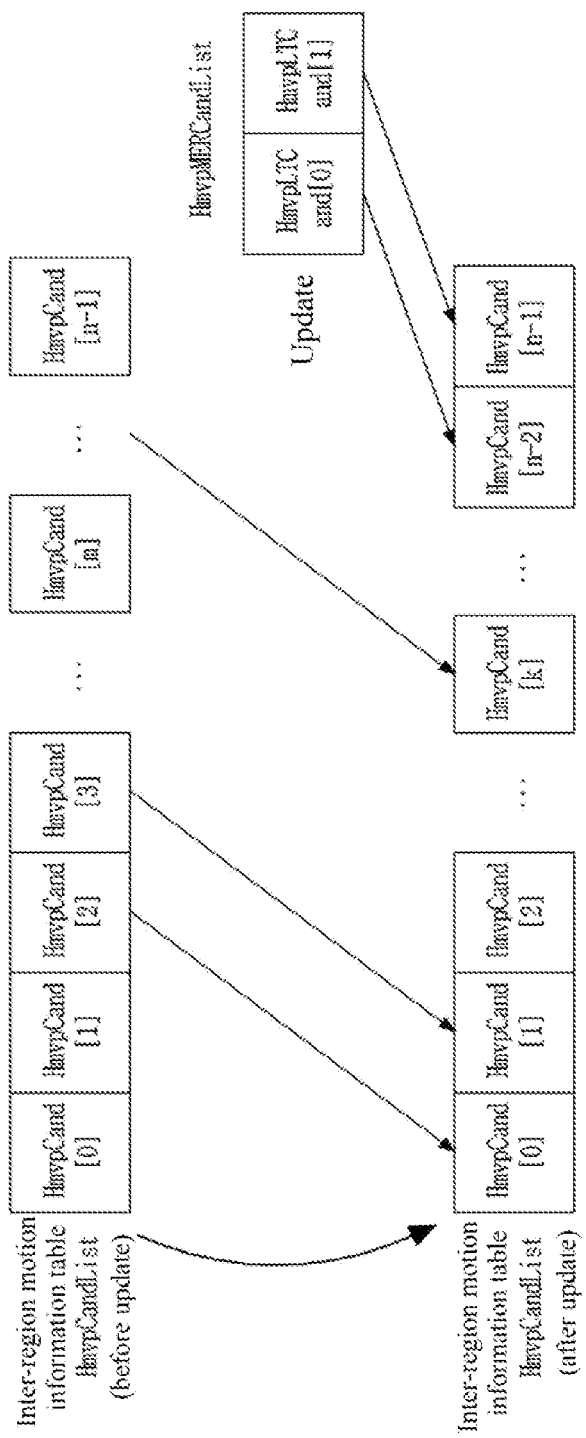
FIG. 27 is a view showing an example of merging a prediction region motion information list and a temporary motion information list.

FIG. 27 is a view showing an example of merging a prediction region motion information list and a temporary motion information list.

When coding/decoding of all the blocks included in the coding tree unit or the merge processing area is completed, as shown in the example of FIG. 27, the prediction region motion information list may be updated with the temporary merge candidates included in the temporary motion information list.

At this point, the temporary merge candidates included in the temporary motion information list may be added to the prediction region motion information list in order of the temporary merge candidates inserted in the temporary motion information list (i.e., in ascending or descending order of index values).

As another example, the temporary merge candidates included in the temporary motion information list may be added to the prediction region motion information list in a predefined order.

Here, the predefined order may be determined according to the scan order of the coding blocks in the merge processing area or the coding tree unit. The scan order may be at least one among the raster scan, horizontal scan, vertical scan, and zigzag scan. Alternatively, the predefined order may be determined based on motion information of each block or the number of blocks having the same motion information.

Alternatively, a temporary merge candidate including unidirectional motion information may be added to the prediction region merge list before a temporary merge candidate including bidirectional motion information. Contrarily, a temporary merge candidate including bidirectional motion information may be added to the prediction region merge candidate list before a temporary merge candidate including unidirectional motion information.

Alternatively, a temporary merge candidate may be added to the prediction region motion information list according to an order of a high use frequency or a low use frequency within the merge processing area or the coding tree unit.

When a temporary merge candidate included in the temporary motion information list is added to the prediction region motion information list, a redundancy check may be performed on the temporary merge candidate. For example, when a prediction region merge candidate the same as the temporary merge candidate included in the temporary motion information list is previously stored in the prediction region motion information list, the temporary merge candidate may not be added to the prediction region motion information list. At this point, a redundancy check may be performed on some of the prediction region merge candidates included in the prediction region motion information list. For example, the redundancy check may be performed on inter prediction merge candidates having an index larger than a threshold value or smaller than a threshold value. For example, when the temporary merge candidate is the same as a prediction region merge candidate having an index larger than or equal to a predefined value, the temporary merge candidate may not be added to the prediction region motion information list.

A prediction region merge candidate derived from a block included in a coding tree unit or a merge processing area the same as those of the current block may be limited from being used as a merge candidate of the current block. To this end, address information of a block may be additionally stored for the prediction region merge candidate. The address information of the block may include one among the location of the block, the address of the block, the index of the block, the location of the merge processing area including the block, the address of the merge processing area including the block, the index of the merge processing area including the block, the location of the coding tree region including the block, the address of the coding tree region including the block, and the index of the coding tree region including the block.

Figure 28:
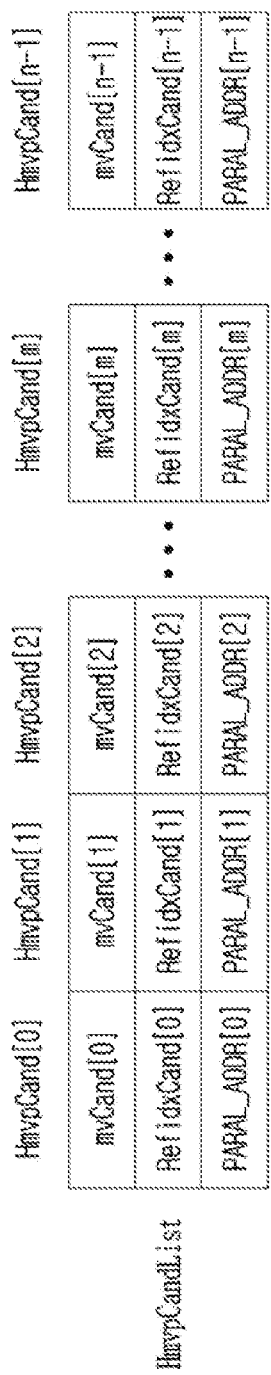
FIG. 28 is a view showing an example in which an encoding region merge candidate includes address information of a block.
Figure 29:
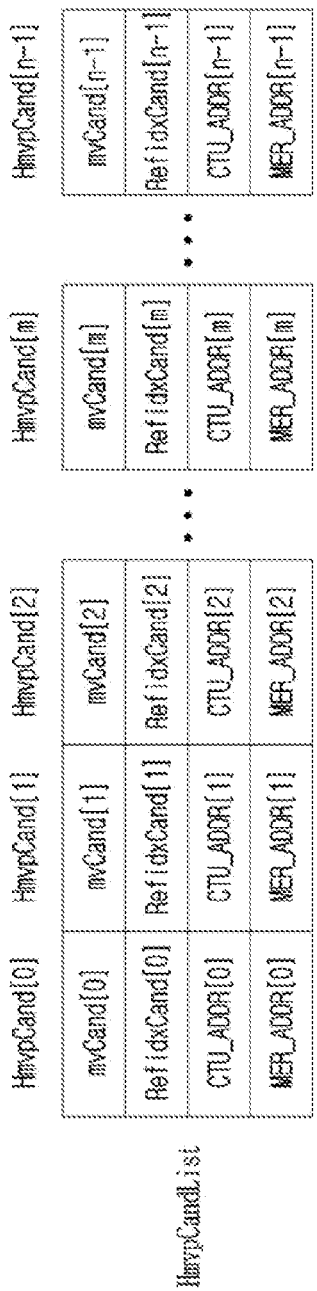
FIG. 29 is a view showing an example in which an encoding region merge candidate includes address information of a block.

FIGS. 28 and 29 are views showing an example in which an encoding region merge candidate includes address information of a block.

Motion information of a block encoded by inter prediction may be stored as motion information of an encoding region merge candidate. For example, a motion vector mv of a block may be stored as a motion vector mvCand of an encoding region merge candidate, and a reference picture index RefIdx of a block may be stored as a reference picture index RefIdxCand of an encoding region merge candidate.

Additionally, address information of a block may be further stored for the encoding region merge candidate. For example, the address BLK_ADR of a block, the address MER_ADDR of a merge processing area including the block, or the address CTU_ADDR of a coding tree unit including the block may be additionally stored.

In the example shown in FIG. 28, it is shown that the motion vector mvCand, the reference picture index RefIdxCand, and the address MER_ADDR of the merge processing area are stored for the encoding region merge candidate.

A plurality of address information may be stored for the encoding region merge candidate. In the example shown in FIG. 29, it is shown that the motion vector mvCand, the reference picture index RefIdxCand, the address MER_ADDR of the merge processing area, and the address CTU_ADDR of the coding tree unit are stored for the encoding region merge candidate.

Whether the encoding region merge candidate can be used as a merge candidate of the current block may be determined by comparing the address of the current block with the address of the encoding region merge candidate. For example, when the index of the merge processing area including the current block and the index of the merge processing area indicated by the encoding region merge candidate is the same, the encoding region merge candidate may be set to be unavailable as a merge candidate of the current block. Alternatively, when the index of the coding tree region including the current block is the same as the index of the coding tree region indicated by the encoding region merge candidate, the encoding region merge candidate may be set to be unavailable as a merge candidate of the current block. That is, an encoding region merge candidate derived from a block included in a merge processing area or a coding tree unit the same as those of the current block, or an encoding region merge candidate derived from a block adjacent to the current block may not be added to the merge candidate list of the current block.

FIGS. 30 and 31 are views showing an example in which an encoding region merge candidate having address information the same as that of the current block is set to be unavailable as a merge candidate of the current block.

When the index of a merge processing area to which the current block belongs is 2, an encoding region merge candidate derived from a block belonging to the merge processing area of index 2 may be set to be unavailable as a merge candidate of the current block. In the example shown in FIG. 30, since address information of the encoding region merge candidate HvmpCand[5] of index 5 indicates index 2, the encoding region merge candidate may be set to be unavailable as a merge candidate of the current block.

When the index of the coding tree unit to which the current block belongs is 2 and the index of the merge processing area to which the current block belongs is 1, an encoding region merge candidate derived from a block included in a coding tree unit and a merge processing area the same as those of the current block may be set to be unavailable as a merge candidate of the current block. In the example shown in FIG. 31, in the case of the encoding region merge candidate HvmpCand[5] of which the index is 5, since the index of the coding tree unit indicates 2 and the index of the merge processing area indicates 1, the encoding region merge candidate may be set to be unavailable as a merge candidate of the current block.

As another example, when the difference between the address information indicated by the encoding region merge candidate and the address information of the current block is greater than or equal to a threshold value, the encoding region merge candidate may be set as unavailable. For example, when the difference between the address or index of the coding tree unit indicated by the encoding region merge candidate and the address or index of the coding tree unit to which the current block belongs is greater than or equal to a threshold value, the encoding region merge candidate may be set as unavailable.

Alternatively, as another example, when the difference between the address information indicated by the encoding region merge candidate and the address information of the current block is smaller than or equal to a threshold value, the encoding region merge candidate may be set as unavailable. For example, when the difference between the address or index indicated by the encoding region merge candidate and the address or index of the current block is smaller than or equal to a threshold value, the encoding region merge candidate may be set as unavailable. That is, an encoding region merge candidate derived from a block adjacent to the current block may be set to be unavailable as a merge candidate of the current block.

When an encoding region merge candidate derived from the current block is to be added to an encoding region motion information list, a redundancy check may be performed. At this point, the redundancy check may be determining whether motion information and address information of the encoding region merge candidate derived from the current block are the same as those of an encoding region merge candidate previously stored in the encoding region motion information list. For example, when an encoding region merge candidate having a motion vector, a reference picture index, and address information the same as those of the encoding region merge candidate derived from the current block is previously stored, the encoding region merge candidate derived from the current block may not be added to the encoding region motion information list. Alternatively, when an encoding region merge candidate having a motion vector, a reference picture index, and address information the same as those of the encoding region merge candidate derived from the current block is previously stored, the previously stored encoding region merge candidate may be deleted, and the encoding region merge candidate derived from the current block may be added to the encoding region motion information list. At this point, a largest index or a smallest index may be assigned to the encoding region merge candidate derived from the current block.

Alternatively, it may be set not to consider whether the address information is the same when the redundancy check is performed. For example, although address information of an encoding region merge candidate derived from the current block is different from the address information of an encoding region merge candidate previously stored in the encoding region motion information list, when the motion information of both the encoding region merge candidates is the same, the encoding region merge candidate derived from the current block may not be added to the encoding region motion information list. Alternatively, when although the address information of the encoding region merge candidate derived from the current block is the same as the motion information (→address information) of the encoding region merge candidate previously stored in the encoding region motion information list, the address information (→motion information) is different, the previously stored encoding region merge candidate may be deleted, and the encoding region merge candidate derived from the current block may be added to the encoding region motion information list. At this point, a largest index or a smallest index may be assigned to the encoding region merge candidate derived from the current block.

Intra prediction is for predicting a current block using reconstructed samples that have been encoded/decoded around the current block. At this point, samples reconstructed before an in-loop filter is applied may be used for intra prediction of the current block.

The intra prediction technique includes matrix-based intra prediction, and general intra prediction considering directionality with respect to neighboring reconstructed samples. Information indicating the intra prediction technique of the current block may be signaled through a bitstream. The information may be a 1-bit flag. Alternatively, the intra prediction technique of the current block may be determined based on at least one among the location, the size, and the shape of the current block, or based on an intra prediction technique of a neighboring block. For example, when the current block exists across a picture boundary, it may be set not to apply the matrix-based intra prediction intra prediction to the current block.

The matrix-based intra prediction intra prediction is a method of acquiring a prediction block of the current block by an encoder and a decoder based on a matrix product between a previously stored matrix and reconstructed samples around the current block. Information for specifying any one among a plurality of previously stored matrixes may be signaled through a bitstream. The decoder may determine a matrix for intra prediction of the current block based on the information and the size of the current block.

The general intra prediction is a method of acquiring a prediction block for the current block based on a non-angular intra prediction mode or an angular intra prediction mode.

A derived residual video may be derived by subtracting a prediction video from an original video. At this point, when the residual video is changed to the frequency domain, subjective video quality of the video is not significantly lowered although the high-frequency components among the frequency components are removed. Accordingly, when values of the high-frequency components are converted to be small or the values of the high-frequency components are set to 0, there is an effect of increasing the compression efficiency without generating significant visual distortion. By reflecting this characteristic, the current block may be transformed to decompose a residual video into two-dimensional frequency components. The transform may be performed using a transform technique such as Discrete Cosine Transform (DST) or Discrete Sine Transform (DST).

After the current block is transformed using DCT or DST, the transformed current block may be transformed again. At this point, the transform based on DCT or DST may be defined as a first transform, and transforming again a block to which the first transform is applied may be defined as a second transform.

The first transform may be performed using any one among a plurality of transform core candidates. For example, the first transform may be performed using any one among DCT2, DCT8, or DCT7.

Different transform cores may be used for the horizontal direction and the vertical direction. Information indicating combination of a transform core of the horizontal direction and a transform core of the vertical direction may be signaled through a bitstream.

Units for performing the first transform and the second transform may be different. For example, the first transform may be performed on an 8×8 block, and the second transform may be performed on a subblock of a 4×4 size among the transformed 8×8 block. At this point, the transform coefficients of the residual regions that has not been performed the second transform may be set to 0.

Alternatively, the first transform may be performed on a 4×4 block, and the second transform may be performed on a region of an 8×8 size including the transformed 4×4 block.

Information indicating whether the second transform has been performed may be signaled through a bitstream.

The decoder may perform an inverse transform of the second transform (a second inverse transform), and may perform an inverse transform of the first transform (a first inverse transform) as a result of the inverse transform. As a result of performing the second inverse transform and the first inverse transform, residual signals for the current block may be acquired.

Quantization is for reducing the energy of a block, and the quantization process includes a process of dividing a transform coefficient by a specific constant value. The constant value may be derived by a quantization parameter, and the quantization parameter may be defined as a value between 1 and 63.

When the encoder performs transform and quantization, the decoder may acquire a residual block through inverse quantization and inverse transform. The decoder may acquire a reconstructed block for the current block by adding a prediction block and the residual block.

When a reconstructed block of the current block is acquired, loss of information occurring in the quantization and encoding process may be reduced through in-loop filtering. An in-loop filter may include at least one among a deblocking filter, a sample adaptive offset filter (SAO), and an adaptive loop filter (ALF).

Applying the embodiments described above focusing on a decoding process or an encoding process to an encoding process or a decoding process is included in the scope of the present disclosure. Changing the embodiments described in a predetermined order in an order different from the described order is also included in the scope of the present disclosure.

Although the embodiments above have been described based on a series of steps or flowcharts, this does not limit the time series order of the present disclosure, and may be performed simultaneously or in a different order as needed. In addition, each of the components (e.g., units, modules, etc.) constituting the block diagram in the embodiments described above may be implemented as a hardware device or software, or a plurality of components may be combined to be implemented as a single hardware device or software. The embodiments described above may be implemented in the form of program commands that can be executed through various computer components and recorded in a computer-readable recording medium. The computer-readable recording medium may include program commands, data files, data structures and the like independently or in combination. The computer-readable recording medium includes, for example, magnetic media such as a hard disk, a floppy disk and a magnetic tape, optical recording media such as a CD-ROM and a DVD, magneto-optical media such as a floptical disk, and hardware devices specially configured to store and execute program commands, such as a ROM, a RAM, a flash memory and the like. The hardware devices described above can be configured to operate using one or more software modules to perform the process of the present disclosure, and vice versa.

The present disclosure can be applied to an electronic device that encodes and decodes a video.

What is claimed is:

1. A video decoding method comprising the steps of:
deriving a merge candidate for a current block from a neighboring block of the current block;
adding the derived merge candidate to a merge candidate list;
adding at least one prediction region merge candidate included in a prediction region motion information list to the merge candidate list when a number of merge candidates added to the merge candidate list is smaller than a first threshold value;
when a size of the neighboring block is greater than a preset size, adding the prediction region merge candidate derived based on motion information of the neighboring block to the prediction region motion information list;
deriving motion information for the current block based on the merge candidate list; and
performing motion compensation for the current block based on the derived motion information, wherein
whether to add the prediction region merge candidate to the merge candidate list is determined based on a result of comparison between motion information of the prediction region merge candidate and motion information of a merge candidate included in the merge candidate list.

2. The method according to claim 1, wherein the comparison is performed on at least one merge candidate in the merge candidate list, of which an index is smaller than or equal to a second threshold value.

3. The method according to claim 1, wherein the comparison is performed on a merge candidate derived from a block at a specific position.

4. The method according to claim 1, wherein the comparison is performed on at least one among a merge candidate derived from a left neighboring block positioned on a left side of the current block and a merge candidate derived from a top neighboring block positioned on a top of the current block.

5. The method according to claim 1, wherein when it is determined that there is a merge candidate in the merge candidate list having motion information the same as that of a first prediction region merge candidate, the first prediction region merge candidate is not added to the merge candidate list.

6. The method according to claim 5, wherein determination on whether a second prediction region merge candidate has motion information the same as that of a merge candidate having motion information the same as that of the first prediction region merge candidate is omitted.

7. The method according to claim 1, wherein a difference between a number of prediction region merge candidates included in a prediction region merge candidate list and an index of the prediction region merge candidate is smaller than or equal to a second threshold value.

8. The method according to claim 1, further comprising the step of adding a current inter-region merge candidate derived based on motion information of the current block to an inter-region motion information list, wherein
when there is a prediction region merge candidate the same as a current prediction region merge candidate, the prediction region merge candidate the same as the current prediction region merge candidate is deleted, and a largest index is assigned to the current prediction region merge candidate.

9. The method according to claim 1, wherein the comparison is performed on the prediction region merge candidate having an index larger than a second threshold value.

10. The method according to claim 1, further comprising:
when it is determined that the neighboring block is not included in a predetermined region, adding the prediction region merge candidate derived based on motion information of the neighboring block to the prediction region motion information list; or
when it is determined that the neighboring block is included in the predetermined region, not adding the prediction region merge candidate derived based on motion information of the neighboring block to the prediction region motion information list,
wherein the predetermined region is a merge processing area.

11. The method according to claim 10, further comprising:
adding the prediction region merge candidate derived based on motion information of the neighboring block included in the prediction region motion information list to the merge candidate list when the number of merge candidates added to the merge candidate list is smaller than the first threshold value.

12. The method according to claim 1, further comprising:
adding the prediction region merge candidate derived based on motion information of the neighboring block included in the prediction region motion information list to the merge candidate list when the number of merge candidates added to the merge candidate list is smaller than the first threshold value.

13. A video encoding method comprising the steps of:
deriving a merge candidate for a current block from a neighboring block of the current block;
adding the derived merge candidate to a merge candidate list;
adding at least one prediction region merge candidate included in a prediction region motion information list to the merge candidate list when a number of merge candidates added to the merge candidate list is smaller than a first threshold value;
when a size of the neighboring block is greater than a preset size, adding the prediction region merge candidate derived based on motion information of the neighboring block to the prediction region motion information list;
deriving motion information for the current block based on the merge candidate list; and
performing motion compensation for the current block based on the derived motion information, wherein
whether to add the prediction region merge candidate to the merge candidate list is determined based on a result of comparison between motion information of the prediction region merge candidate and motion information of a merge candidate included in the merge candidate list.

14. The method according to claim 13, wherein the comparison is performed on at least one merge candidate in the merge candidate list, of which an index is smaller than or equal to a second threshold value.

15. The method according to claim 13, wherein the comparison is performed on a merge candidate derived from a block at a specific position.

16. The method according to claim 13, wherein the comparison is performed on at least one among a merge candidate derived from a left neighboring block positioned on a left side of the current block and a merge candidate derived from a top neighboring block positioned on a top of the current block.

17. The method according to claim 13, wherein when it is determined that there is a merge candidate in the merge candidate list having motion information the same as that of a first prediction region merge candidate, the first prediction region merge candidate is not added to the merge candidate list.

18. The method according to claim 17, wherein determination on whether a second prediction region merge candidate has motion information the same as that of a merge candidate having motion information the same as that of the first prediction region merge candidate is omitted.

19. The method according to claim 13, wherein a difference between a number of prediction region merge candidates included in a prediction region merge candidate list and an index of the prediction region merge candidate is smaller than or equal to a second threshold value.

20. The method according to claim 13, further comprising the step of adding a current inter-region merge candidate derived based on motion information of the current block to an inter-region motion information list, wherein
when there is a prediction region merge candidate the same as a current prediction region merge candidate, the prediction region merge candidate the same as the current prediction region merge candidate is deleted, and a largest index is assigned to the current prediction region merge candidate.

21. The method according to claim 13, wherein the comparison is performed on the prediction region merge candidate having an index larger than a second threshold value.

22. The method according to claim 13, further comprising:
when it is determined that the neighboring block is not included in a predetermined region, adding the prediction region merge candidate derived based on motion information of the neighboring block to the prediction region motion information list; or
when it is determined that the neighboring block is included in the predetermined region, not adding the prediction region merge candidate derived based on motion information of the neighboring block to the prediction region motion information list,
wherein the predetermined region is a merge processing area.

23. The method according to claim 22, further comprising:
adding the prediction region merge candidate derived based on motion information of the neighboring block included in the prediction region motion information list to the merge candidate list when the number of merge candidates added to the merge candidate list is smaller than the first threshold value.

24. The method according to claim 13, further comprising:
adding the prediction region merge candidate derived based on motion information of the neighboring block included in the prediction region motion information list to the merge candidate list when the number of merge candidates added to the merge candidate list is smaller than the first threshold value.

25. A video decoding apparatus comprising an inter prediction part for deriving a merge candidate for a current block from a neighboring block of the current block, adding the derived merge candidate to a merge candidate list, adding at least one prediction region merge candidate included in a prediction region motion information list to the merge candidate list when a number of merge candidates added to the merge candidate list is smaller than a first threshold value, deriving motion information for the current block based on the merge candidate list, and performing motion compensation for the current block based on the derived motion information, wherein whether to add the prediction region merge candidate to the merge candidate list is determined based on a result of comparison between motion information of the prediction region merge candidate and motion information of a merge candidate included in the merge candidate list.

26. A video encoding apparatus comprising an inter prediction part for deriving a merge candidate for a current block from a neighboring block of the current block, adding the derived merge candidate to a merge candidate list, adding at least one prediction region merge candidate included in a prediction region motion information list to the merge candidate list when a number of merge candidates added to the merge candidate list is smaller than a first threshold value, deriving motion information for the current block based on the merge candidate list, and performing motion compensation for the current block based on the derived motion information, wherein whether to add the prediction region merge candidate to the merge candidate list is determined based on a result of comparison between motion information of the prediction region merge candidate and motion information of a merge candidate included in the merge candidate list.

27. The method according to claim 1, further comprising:

whether to add to a second prediction region merge candidate to the merge candidate list is determined based on a result of comparison between motion information of the second prediction region merge candidate included in the prediction region motion information list and motion information of the merge candidate included in the merge candidate list.

28. The method according to claim 13, further comprising:

whether to add to a second prediction region merge candidate to the merge candidate list is determined based on a result of comparison between motion information of the second prediction region merge candidate included in the prediction region motion information list and motion information of the merge candidate included in the merge candidate list.

* * * * *